(12) United States Patent
Bauer et al.

(10) Patent No.: US 12,147,222 B2
(45) Date of Patent: Nov. 19, 2024

(54) COMPUTER-IMPLEMENTED DETERMINATION OF A QUALITY INDICATOR OF A PRODUCTION BATCH-RUN OF A PRODUCTION PROCESS

(71) Applicant: ABB Schweiz AG, Baden (CH)

(72) Inventors: Reinhard Bauer, Heidelberg (DE); Martin Hollender, Dossenheim (DE); Marco Gaertler, Dossenheim (DE)

(73) Assignee: ABB Schweiz AG, Baden (CH)

( * ) Notice: Subject to any disclaimer, the term of this patent is extended or adjusted under 35 U.S.C. 154(b) by 455 days.

(21) Appl. No.: 17/500,982

(22) Filed: Oct. 14, 2021

(65) Prior Publication Data

US 2022/0035351 A1 Feb. 3, 2022

Related U.S. Application Data

(63) Continuation of application No. PCT/EP2020/060203, filed on Apr. 9, 2020.

(30) Foreign Application Priority Data

Apr. 17, 2019 (EP) .................................... 19169994

(51) Int. Cl.
*G05B 19/418* (2006.01)

(52) U.S. Cl.
CPC .................. *G05B 19/41875* (2013.01); *G05B 2219/32077* (2013.01)

(58) Field of Classification Search
CPC ............... G05B 19/41875; G05B 2219/32077
See application file for complete search history.

(56) References Cited

U.S. PATENT DOCUMENTS

| 5,914,884 A * | 6/1999 | Gur Ali ................... B29C 45/76 |
| | | 700/47 |
| 8,880,203 B2 | 11/2014 | Wojsznis et al. |

(Continued)

FOREIGN PATENT DOCUMENTS

| CN | 102298319 A | 12/2011 |
| CN | 103874964 A | 6/2014 |
| EP | 2172820 A1 | 4/2010 |

OTHER PUBLICATIONS

Aminata Kane et al., "Multivariate Time Series Representation and Similarity Search Using PCA," Jul. 2017, pp. 122-136, Springer Link, New York City, NY, United States.

(Continued)

*Primary Examiner* — Thomas C Lee
*Assistant Examiner* — Tyler Dean Hedrick
(74) *Attorney, Agent, or Firm* — Leydig, Voit & Mayer, Ltd.

(57) ABSTRACT

To determine a quality indicator of production batch-run of a production process, a computer compares time-series with multi-source data from a reference batch-run and time-series with multi-source data from the production batch-run. Before comparing, the computer converts multi-variate time-series to uni-variate time-series, by first multiplying data values of source-specific uni-variate time-series with source-specific factors from a conversion factor vector and second summing up the multiplied data values according to discrete time points. The source-specific factors of the conversion factor vector are obtained earlier by processing reference data, including the determination of characteristic portions of the time-series, converting, aligning by time-warping and evaluating displacement in time between characteristic portions before alignment and after alignment.

13 Claims, 16 Drawing Sheets

(56) References Cited

U.S. PATENT DOCUMENTS

| | | | | |
|---|---|---|---|---|
| 2003/0074251 | A1* | 4/2003 | Kumar | G06Q 30/0201 |
| | | | | 702/179 |
| 2005/0205528 | A1 | 9/2005 | D Angelo et al. | |
| 2011/0288660 | A1* | 11/2011 | Wojsznis | G05B 23/024 |
| | | | | 700/30 |
| 2013/0024415 | A1 | 1/2013 | Herzog | |
| 2018/0189128 | A1* | 7/2018 | Qiao | G06N 20/20 |
| 2019/0042956 | A1 | 2/2019 | Huang et al. | |
| 2019/0332101 | A1* | 10/2019 | Castillo Castillo | ........... |
| | | | | G05B 23/0254 |
| 2020/0082013 | A1* | 3/2020 | Triplet | G06N 5/022 |

OTHER PUBLICATIONS

Aminata Kane, "Efficient and Scalable Techniques for Multivariate Time Series Analysis and Search," Aug. 2017, pp. 1-144, Concordia University, St. Montreal, Quebec, Canada Retrieved from the internet: <URL:https://spectrum.library.concordia.ca/983254/1/Kane_PhD_F2017.pdf.

Giorgino, "Computing and Visualizing Dynamic Time Warping Alignments in R: The dtw Package," *Journal of Statistical Software*, 31(7): 1-24 (Aug. 14, 2009).

European Patent Office, Extended European Search Report in European Patent Application No. 19169994.1, 9 pp. (Nov. 4, 2019).

European Patent Office, International Preliminary Report on Patentability in International Patent Application No. PCT/EP2020/060203, 9 pp. (Sep. 28, 2021).

European Patent Office, International Search Report in International Patent Application No. PCT/EP2020/060203, 4 pp. (Jun. 23, 2020).

European Patent Office, Written Opinion in International Patent Application No. PCT/EP2020/060203, 8 pp. (Jun. 23, 2020).

Su et al., "Univariate Time Series Clustering Method Based on Principal Component Analysis," *Operations Research and Management Science*, 20(6): 66-72 (Dec. 25, 2011).

Zhang et al., "Multivariate Time Series Attribute Selection Based on Correlation Density," *Computer Applications and Software*, 34(12): 273-277 (Dec. 15, 2017).

Zheng et al., "LS-Cluster: Large Scale Multivariate Time Series Clustering Method," *Computer Applications and Software*, 34(5): 205-210 (May 15, 2017).

\* cited by examiner

General data
$D$
$d_{kv}$
$\{D_v\}$ time
$1 \ldots k \ldots K$
$[t_1, t_K]$ sources/variates
$1 \ldots v \ldots V$

Reference reference data
$R, Q', R'$
$r_{kv}$
$\{R_v\}$ $1 \ldots m \ldots M$
$[t_1, t_M]$ $1 \ldots v \ldots V$

Production production data
$P$
$p_{kv}$
$\{P_v\}$ $1 \ldots n \ldots N$
$[t_1, t_N]$ $1 \ldots v \ldots V$

FIG. 3

COMPUTER-IMPLEMENTED DETERMINATION OF A QUALITY INDICATOR OF A PRODUCTION BATCH-RUN OF A PRODUCTION PROCESS

CROSS-REFERENCE TO PRIOR APPLICATIONS

This application is a continuation of International Patent Application No. PCT/EP2020/060203, filed on Apr. 9, 2020, which claims priority to European Patent Application No. EP 19169994.1, filed on Apr. 17, 2019. The entire disclosure of both applications is hereby incorporated by reference herein.

FIELD

In general, one or more embodiments of the disclosure may relate to production processes, and more in particular, the one or more embodiments may relate to computer systems, methods and computer-program products to determine quality indicators for batch-runs of the production process.

BACKGROUND

In industry, technical systems perform production processes. It is desired that both the production processes and the resulting products are in conformity (or "compliance") with pre-defined specifications. However, this is not always the case. Therefore, quality categories can be assigned to particular performances (or "batch-runs") of the production processes, and can be assigned to particular products.

Simplified, a quality indicator can differentiate—at least—between conforming production and non-conforming production. Conformance is usually associated with the indicator "success" and non-conformance is usually associated with the indicator "failure". A quality indicator can also differentiate between production that results in a conforming product and a production that results in a non-conforming product. Further quality categories can also be used (e.g., "first choice", "second choice"). Quality indicators represent the internal state of the technical system that performs the production process.

Collecting data during production is a source of information that—when properly evaluated—can lead to improvements (in the performance of the process). Data can result from measurement signals (e.g., the temperature of a production apparatus), from control instructions that are related to production events (e.g. to open or to close a particular valve, to add material), or from status indicators.

As batch processing is widely adopted in particular industries, such as in chemical industry, data can be collected for individual batches. Conventions regarding batch control are standardized, such as in ANSI/ISA-88 and equivalents (e.g., IEC 61512-1:1997, IEC 61512-2:2001, IEC 61512-3:2008, IEC 61512-4:2009).

For batch processing, data is available as time-series, i.e. series of data values indexed in time order for subsequent time points. Time-series are related to particular batches and/or related to the resulting products.

Evaluating the data can comprise the detection of similarities between time-series from different batch runs. Similarity can be considered, for example, if a similarity index exceeds a particular threshold. Or, in a further example, similarity can be considered if data processing recognizes patterns, such as characteristic data values over time.

Time-series from a particular batch run in the past ("historic batch run" or "reference batch-run") can serve as a reference time-series. One or more quality categories can be assigned to the reference. To stay with the above-mentioned simplified categories, the reference time-series can be classified for conforming production, for non-conforming production, for a conforming product or for a non-conforming product. A further simplification uses the success and failure categories only. Particular batch-runs conforming both in production and product (and potentially to further, more-detailed specifications) can be regarded as "golden batches".

As used herein, time-series from particular batch-runs (that are on-going) are production time-series. Similarity between the production time-series and the reference time-series can indicate the category, such as conforming production, non-conforming production (conforming product or non-conforming product), reaching the "golden batch" is desired.

However, detecting similarity between time-series is not as easy as comparing numbers with thresholds or the like. There are—at least—two constraints:

Looking at the first constraint, the time interval as the basis for time-series is not the same for all, even if the production process is the same. Batch processing does not mean to perform each particular production batch-run with same temporal length (or duration). The duration of production batch-runs usually differ from batch to batch. There are many reasons for different durations. For example, chemical reactions have variable durations due to varying ambient conditions. Operators potentially put processes on hold due to logistic reasons (e.g. tank full, next equipment occupied) and resume them at a later point in time. Operator actions have variable durations as well.

Looking at the second constraint, data does not comprise one data value over time, such as the mentioned temperature, but data usually originates from much more sources. There can be measurement values for further physical phenomena, such as pressure, there can be parameters such as the rotation speed of a motor, the opening or closing states of valves and so on. Further parameters refer to mentioned control instructions (e.g., to open/close valves, add material) and/or to status indicators. In other words, data is multi-variate data.

Dynamic time warping (DTW) is an overall term for algorithms to compare and to align time-series with each other.

An overview to DTW and to DTW-software is available, for example, in [1] Toni Giorgino: "Computing and Visualizing Dynamic Time Warping Alignments in R: the dtw Package" (Journal of Statistical Software Vol 31 (2009), Issue 7). Much simplified, DTW allows comparing time-series even if the time basis is different. Techniques are available to take differences in time into account. For example, FIG. 1 of reference [1] illustrates that two time-series can be aligned and that similarity can be calculated by investigating alignment distances. Reference [1] also explains an approach to accommodate multi-variate data.

However, there is a further constraint: some of the DTW algorithm may ignore some characteristics of the time-series, so that, for example, characteristic patterns that indicate a particular failure (of the batch-run, or the product) can't be identified. Such un-desired effects are known as "over-aggressive warping". In other words, characteristic patterns can indicate problems that occur during the production, characteristic pattern may disappear if the data processing is not sensitive enough.

Still further, relating batch-runs to quality categories can be too late, especially when the category indicates failure. The mentioned constraints may contribute to a delay.

There is a need to find approaches that take these constraints into account.

SUMMARY

In one or more embodiments, the present invention may provide a computer-implemented method to determine a quality indicator (Q) of a particular production batch-run in accordance with a predefined production process, wherein technical equipment performs the predefined production process and thereby provides data in the form of time-series from a set of data sources, wherein the data sources are related to the technical equipment. The method includes: reading a converted reference time-series ({R}#); receiving a multi-variate time-series ({{P}}) from the production batch-run of the predefined production process, the multi-variate time-series ({{P}}) having a set of uni-variate time-series ({Pv}) from the set of data sources; converting the multi-variate time-series ({{P}}) from the production batch-run by—first—multiplying data values of the uni-variate time-series ({Pv}) with source-specific factors of the conversion factor vector and—second—summing up the multiplied data values according to discrete time points of the multi-variate time-series ({{P}}) from the production batch-run, resulting in a converted production time-series ({P}#) that is uni-variate; and comparing the converted reference time-series ({R}#) with the converted production time-series ({P}#), thereby differentiating the production batch-run of the predefined production process as conforming to a particular quality category or as non-conforming to the particular quality category.

BRIEF DESCRIPTION OF THE DRAWINGS

One or more embodiments of the present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 3 illustrates a table with an overview to writing conventions that are applicable to the subsequent batch-runs;

FIGS. 9, 10a, 1b, 10c, and 11 illustrate trajectories of time-series to explain machine learning to obtain source-specific factors by way of example;

DETAILED DESCRIPTION

Figure 1:
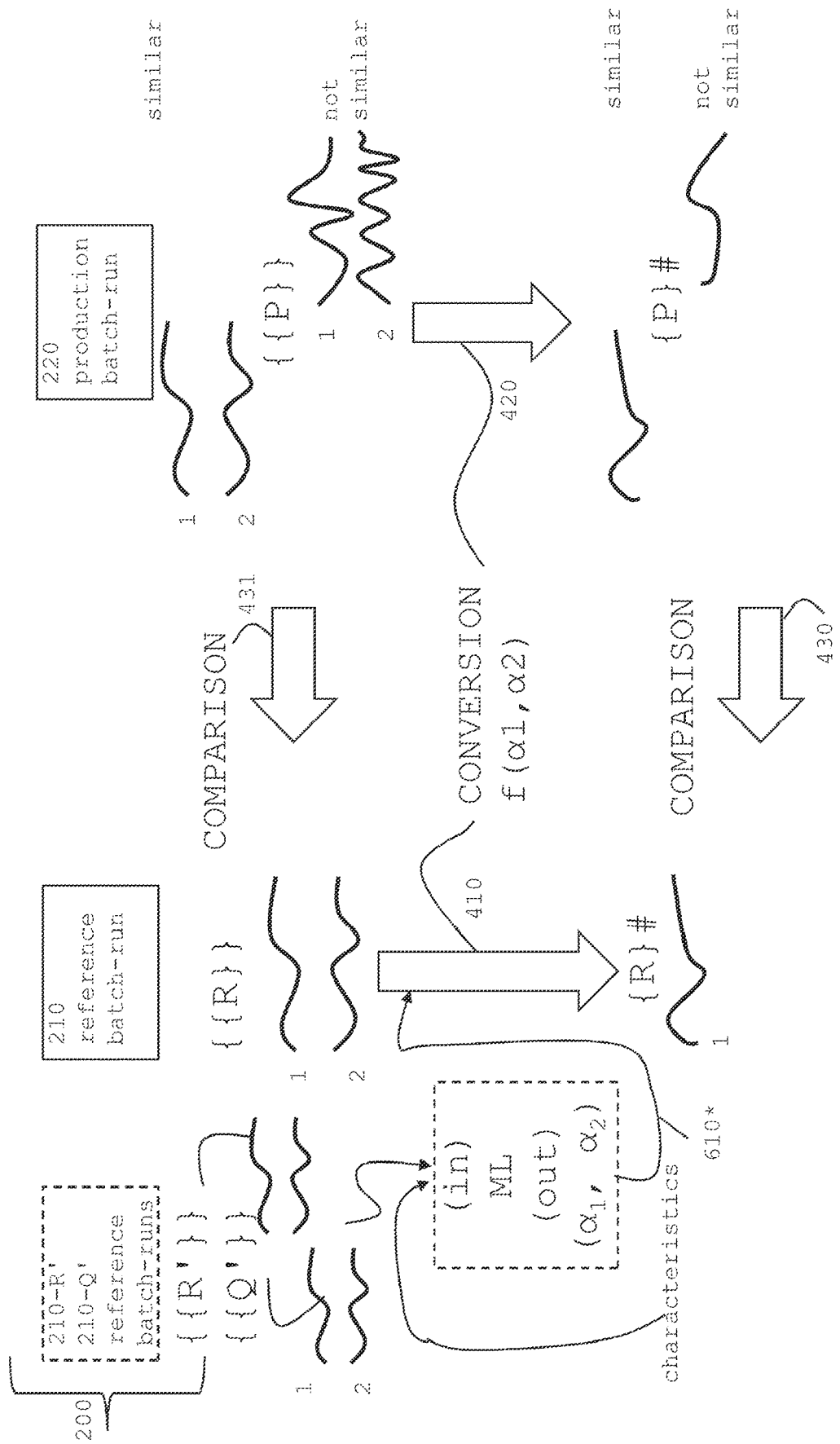
FIG. 1 illustrates an overview to the performance of a production process in two subsequent batch-runs.

To determine a quality indicator of a production batch run of a production process into a quality category, a computer compares time-series with multi-source data from a reference batch-run and time-series with multi-source data from the production batch-run. Before comparing, the computer converts multi-variate time-series to uni-variate time-series, by first multiplying data values of source-specific uni-variate time-series with source-specific factors from a conversion factor vector and second summing up the multiplied data values according to discrete time points. The source-specific factors of the conversion factor vector are obtained earlier by processing reference data, comprising the determination of characteristic portions of the time-series, converting, aligning by time-warping and evaluating displacement in time between characteristic portions before alignment and after alignment.

According to embodiments, comparing reference time-series and production time-series is made more efficient and accurate for situations in that both time-series are multi-variate time-series, i.e. sets of time-series from multiple sources.

In applying computer-implemented methods, a computer receives multi-variate time-series and converts them to uni-variate time-series. The conversion comprises multiplying the data values with source-specific factors and summing up the multiplied data values according to discrete time points. The computer then compares uni-variate time-series, but not multi-variate series. Such a conversion can be considered as a routine that is called in several method steps.

In executing a first method—hereinafter the reference method—the computer receives a multi-variate time-series (from a reference batch-run of the production process). The computer applies the conversion that results in a converted reference time-series that is uni-variate. The reference batch-run conforms to a particular quality category.

In executing a second method—hereinafter the production method—the computer (the same computer or a different computer) processes a further multi-variate time-series from a subsequent batch-run of the production process to a converted production time-series that is uni-variate as well. The computer then compares the converted reference time-series and the converted production time-series, both being uni-variate time-series. The comparison leads to the identification of similarity (or non-similarity). Similarity can indicate that the production batch-run (of the production process) has the same quality category as the reference batch-run. In other words, at the end of the second method, comparing differentiates the production batch-runs of the production process as conforming to the quality category of the reference batch-runs, or not.

Having two uni-variate time-series available, one from the reference batch-run of the production process, and one from a production batch-run (of the production process) allows using off-the-shelf software—such as time-warp—to determine a similarity index and/or to identify characteristic patterns (or "signatures", or "fingerprints"). Depending on the similarity index (and/or identified patterns), the production equipment that performs the production process can be controlled.

Thereby, the computer obtains status information for the production equipment (being a technical system performing the production process). The status information comprises— at least—an indication of the quality category More in detail, there is a computer-implemented method—the production method—to determine a quality indicator for a production batch-run of a production process. Technical equipment performs the production process and thereby provides data in the form of time-series from a set of data sources. The data sources are related to the technical equipment: The data sources can be part of the equipment, or the data sources correspond to data that flows to or from the equipment. The method is performed by a similarity module of the computer.

The similarity module reads a converted reference time-series that is uni-variate and that has been provided in a previous execution of a step sequence, with receiving a multi-variate time-series from the reference batch-run (of the production process, the reference batch-run conforming to a particular quality category, the multi-variate time-series having a set of uni-variate time-series from the set of data sources, and converting the multi-variate time-series from the reference batch-run, by the first sub-step multiplying data values of the uni-variate time-series with source-specific factors from an conversion factor vector and by the second sub-step summing up the multiplied data values according to the discrete time points of the multi-variate time-series of the reference batch-run.

Having read the converted reference time-series, the similarity module receives the multi-variate time-series from the production batch-run (of the production process), the multi-variate time-series also having a set of uni-variate time-series from the set of data sources.

The similarity module then converts the multi-variate time-series (from the production batch-run) by—first—multiplying data values of the uni-variate time-series with the source-specific factors of the conversion factor vector and—second—summing up the multiplied data values according to the discrete time points of the multi-variate time-series from the production batch-run, resulting in a converted production time-series that is uni-variate as well.

The similarity module then compares the converted reference time-series with the converted production time-series and thereby differentiates the production batch-run of the production process as conforming to the particular quality category or as non-conforming to the particular quality category.

Optionally, comparing is executed with a time-warp operation.

The technical equipment can be industrial equipment, with data sources that provide measurement values, control instructions, or status indicators.

The quality category can be a quality category for the performance of the process.

Optionally, the source-specific factors are obtained through machine learning that uses two or more reference time-series as input. It is advantageous for the accuracy of the comparison (later by the similarity module) that the reference time-series result from process batch-runs that have led to the same quality category.

Optionally, there is a first group of reference time-series having the quality category (that is to be determined for the production batch-run), and a there is a second group of reference times-series having either quality category. This approach may be advantageous in having robust factors.

In that case, the similarity module performs the converting steps by using source-specific factors from the conversion factor vector that has been obtained previously by a step sequence. The step sequence is a further computer-implemented method—the factor method—for obtaining the conversion factor vector, executed by a factor module.

The factor module receives reference data from at least two further reference batch-runs of the production process, the reference data being a first multi-variate time-series and a second multi-variate time-series. The first and the second multi-variate time-series both comprise first uni-variate time-series with data from the first data source and second uni-variate time-series with data from the second data source.

The factor module determines characteristics by determining characteristic portions of the uni-variate-time-series, and by determining relations between the characteristic portions between the first uni-variate time-series and the second uni-variate time-series.

For a plurality of factor vectors separately (i.e. actions for each factor vector performed in parallel, or sequentially) the factor module converts the first multi-variate time-series to a converted first time-series and converts the second multi-variate time-series to a converted second time-series, converting uses the sub-steps multiplying and summing up.

For the plurality of factor vectors separately, the factor module aligns the converted first time-series and the converted second time-series by executing a time-warp operation.

For the plurality of factor vectors separately, the factor module evaluates portion-specific displacements of the relations to identify a particular factor vector as the conversion factor vector.

Optionally, evaluating the portion-specific displacements comprises to sum up the portion-specific displacements and to identify the conversion factor vector as the vector for that the sum of the portion-specific displacements is smallest.

Optionally, evaluating the portion-specific displacements comprises to sum up the portion-specific displacements as the sum of the absolute values.

Optionally, determining characteristics comprises an interaction with a user, with the factor module presenting the first and second multi-variate time-series by their trajectories to the user, and with determining the characteristic portions and determining the relations through annotations made by the user.

Optionally, determining characteristics comprises processing the first and second multi-variate time-series with curve-sketching techniques and determining the characteristic portions and determining the relations through pre-defined rules.

Optionally, the similarity module and the factor module receive the multi-variate time-series with numerical values that have been normalized.

The involvement of human persons is defined by their functions. As used herein, the "operator" is the person who interacts with technical equipment. The "user" is the person who interacts with the computer. The operator can become a user at various occasions, for example when he or she uses information (such as status information, quality categories etc.) from the computer to change the interaction with the technical equipment. Information about the internal state (of the technical equipment) enables the operator to take corrective action. In some situations, the user can be an expert user. The expert use can have acquired the expertise from being an operator.

Time-series can have properties such as "uni-variate", symbolized by "single" curly brackets { }, or "multi-variate" symbolized by "double" curly brackets {{ }}. Time-series that have obtained the "uni-variate" property by conversion can be marked by #. Time-series for that the number of variates does not matter are given by * *.

Time points are symbolized by "$t_k$" with index k. Time intervals can be given as closed intervals by square brackets as in $[t_1, t_K]$, with the limit points $t_1$, $t_K$ belonging to the interval. Unless stated otherwise, the duration between consecutive time points ("time slot") is equal: $\Delta t = t_{k+1} - t_k$.

FIG. 1 illustrates the overview to the performance of production process 200 in two subsequent batch-runs 210 and 220. Production process 200 is being performed by technical equipment (cf. 110 in FIG. 4). Reference batch-run 210 comes first and production batch-run 220 comes second. By performing production process 200, the technical equipment provides data from a set of sources. The data sources are related to the technical equipment (cf. FIG. 4): The data sources can be part of the equipment, or the data sources correspond to data that flows to or from the equipment.

Due to the batch-run sequence, data from reference batch-run 210 is historic data in relation to the data of production batch-run 220.

Both batch-runs provide data in multiple variants. In FIG. 1, data is illustrated graphically by trajectories, and data is also illustrated as multi-variate time-series {{R}} (reference data from reference batch-run 210) and {{P}} (production data from production batch-run 220). In the example, "multi-variate" is simplified to "bi-variate", the trajectories therefore have indices 1 and 2.

As illustrated by differently shaped trajectories of the time-series, production batch-run 220 can result in production data that is similar to reference data or that is not similar.

Computer-implemented comparison 431 (horizontal arrow) is possible between {{P}} and {{R}}, using calculation technology from reference [1] or using other technologies. This "multi-to-multi" comparison results in statements (for example "similar" or "not similar") that can be related to quality categories. For example, determining similarity between {{P}} and {{R}} can indicate that production batch-run 220 has the same quality category as reference batch-run 210 (no matter if the category is "success" or "failure").

An alternative approach for the comparison will be explained in connection with FIG. 13.

As it will be explained, computer-implemented conversion 410 and 420 (vertical arrows, details in FIGS. 4-5) can convert multi-variate time-series {{R}} and {{P}} to uni-variate time-series {R}#and {P}#. In other words, this is a "multi-to-uni" conversion. The subsequence comparison 430 leads to result statements as well.

As multi-to-uni-conversion 410/420 (here illustrated as "bi-to-uni" conversion) inherently removes information, conversion 410/420 must retain as much as possible information that is needed for comparison 430. The description describes this information by "characteristic portions" of the time-series or as "characteristic shapes" of the trajectory. A sequence of characteristic portions or shapes can be considered as "signature" (because the trajectory looks like a human signature).

As batch-runs 210 and 220 usually have different durations, "batch run intervals", comparing time-series (multi-variate comparison 431, or uni-variate comparison 430 following conversion 410/420) can comprise an alignment (reference [1] with details). For simplicity of explanation, it is assumed that the production batch run has been finalized, but the teachings herein can be applied to a partial batch run, i.e. a run that continues. A particular example for processing partial batch-runs (in real-time) is explained in connection with FIG. 12.

Conversion 410/420 is a function of conversion factor vector 610*, here illustrated as vector ($\alpha_1, \alpha_2$ for v=1 and v=2) with two factors that correspond to the two trajectories (cf. the indices 1 and 2). In principle, there are two optional alternatives to obtain conversion factor vector 610*:
  by manually evaluating reference data {{R}}, with explanations in connection with FIG. 6, or by
  machine learning (ML) as explained throughout the major part of this description, with selecting conversion factor vector 610* from a plurality of candidate factor vectors, with vector 610* being the result of training (supervised, or un-supervised).

Figure 4:
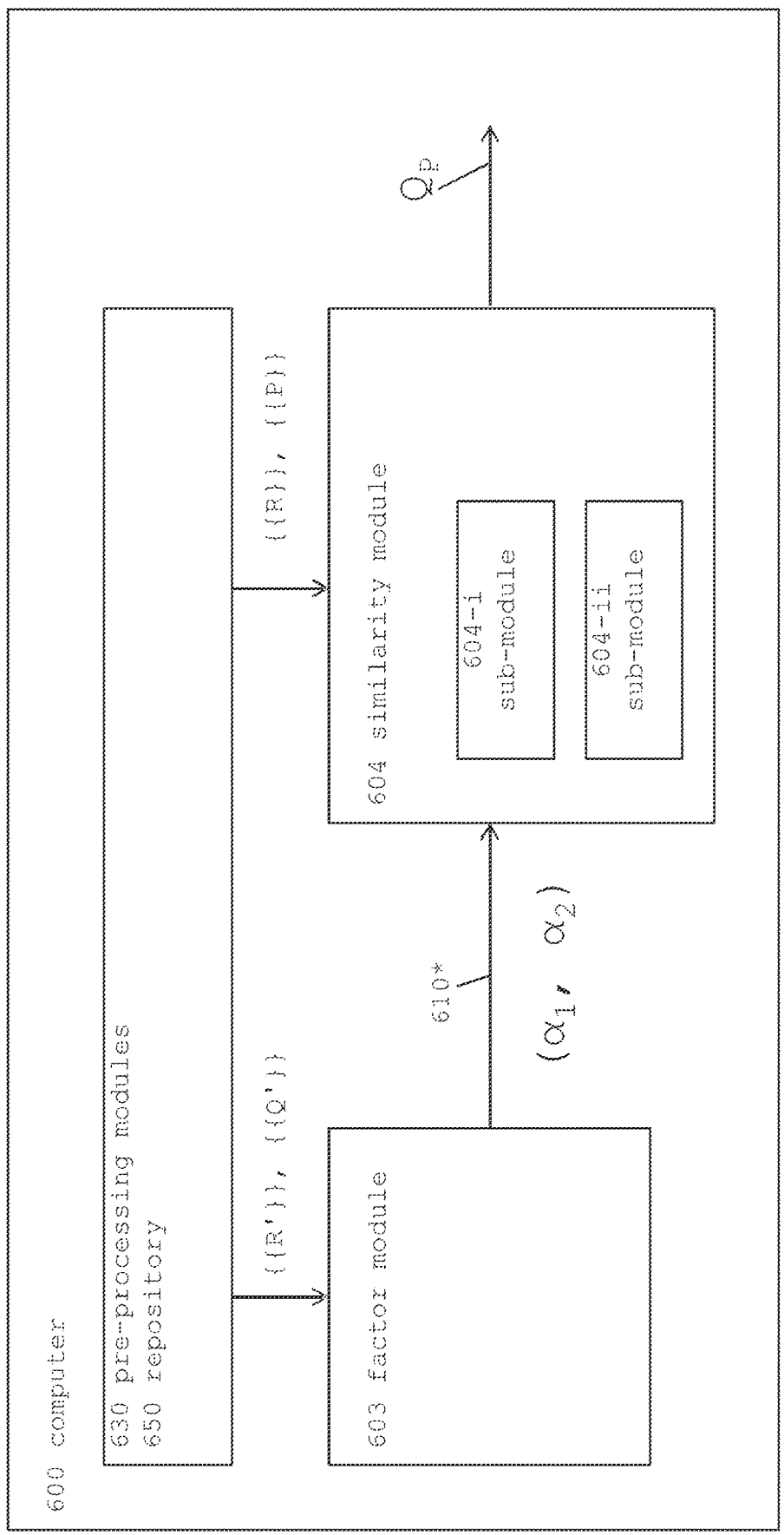
FIG. 4 illustrates a block diagram of a computer.
Figure 8:
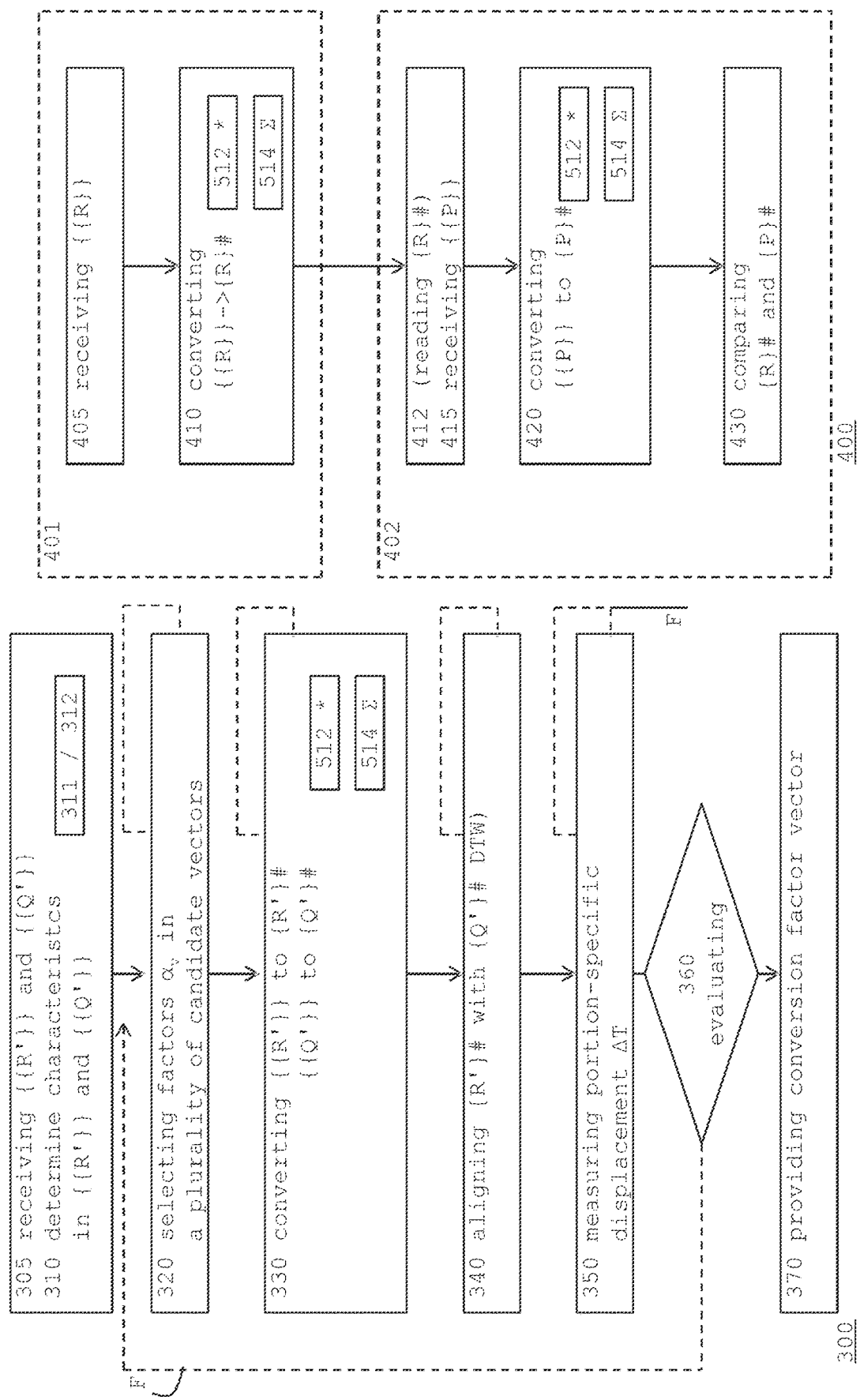
FIG. 8 illustrate flow-chart diagrams for computer-implemented methods.
Figure 9:
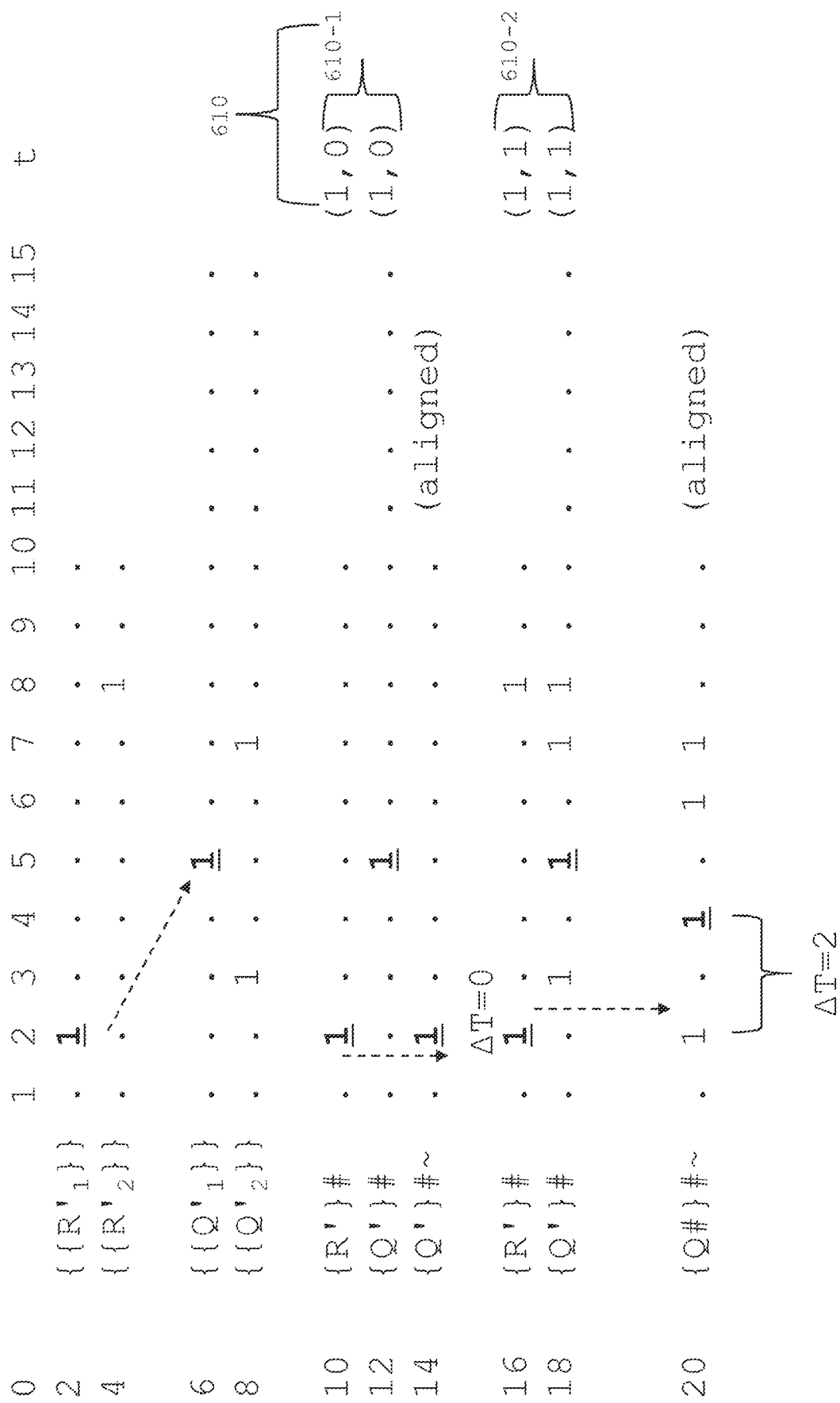

Optionally, conversion factor vector 610* can be obtained as output of a computer module—the factor module—that performs machine learning (ML, dashed box, overview in FIGS. 4 and 8 with example in FIGS. 9-10).

As input, the factor module uses data from a number of further reference batch-runs 210-R' and 210-Q'. Also, the factor module determines characteristics for these reference batch-runs. Optionally, the determination of characteristics can be performed by interacting with the mentioned expert user.

The factor module executes a sequence of steps that among them conversion and alignment steps (in a loop). The factor module executes the sequence in repetitions or in parallel, and the execution of the sequence ends if compliance with pre-defined accuracy conditions is detected.

Figure 2:
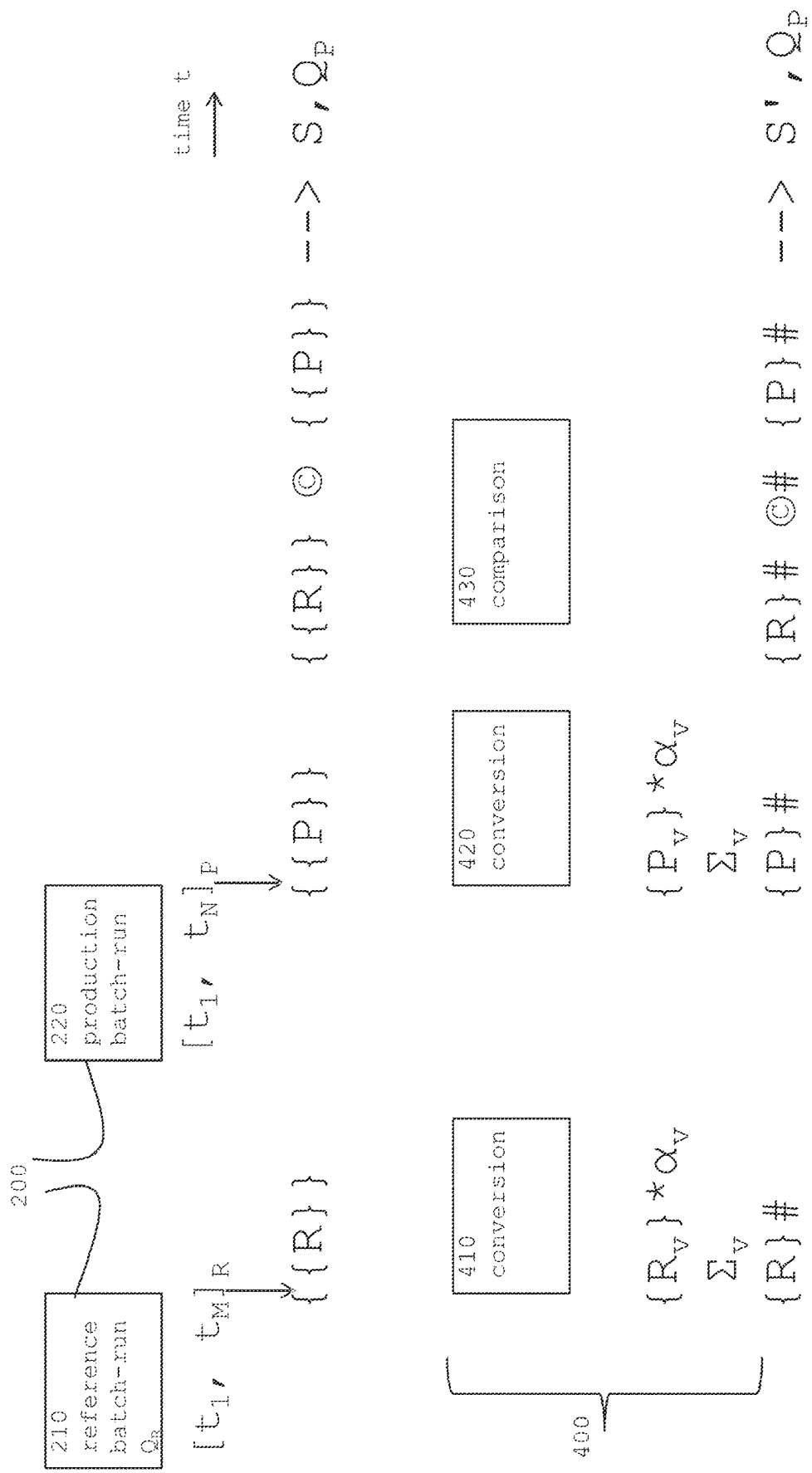
FIG. 2 illustrates an overview to the performance of a production process in two subsequent batch-runs, and also illustrates a computer-implemented method.

FIG. 2 illustrates the overview to the performance of production process 200 in two subsequent batch-runs 210 and 220 (i.e., the "batch-runs") with more detail. Production process 200 is being performed by technical equipment (cf. FIG. 4). As illustrated, the time progresses from left to right. As mentioned, reference batch-run 210 comes first and production batch-run 210 comes second.

From the perspective of the operator, production batch-run 220 is the "current" batch-run that has been finalized (at time point tN at the end of the interval [t1, tN]. The operator is interested to know the quality category (of production batch-run 220), and—if possible—also that of the product being produced.

In embodiments (cf. FIG. 12), the operator can determine the quality category at an earlier point in time, with the opportunity to modify the production batch-runs (that is ongoing). In other words, at time point tN the operator needs to obtain a status indicator of the equipment as the technical system that performs the batch-run. The equipment may continue to perform that batch-run after tN, potentially under different conditions set be the operator (according to the status indicator).

Batch-runs 210, 220 result in data that can be noted as matrices. Simplified, individual data values can be distinguished according to the source (index v) and according to discrete time points, so that the matrices are multi-variate time-series {{ }}.

Reference batch-run 210 results in reference data in the form of the already-mentioned multi-variate time-series {{R}}, as symbolized by the arrow at the right side of box 210. Quality category QR can be assigned to reference batch-run 210 as well. QR can have different attributes, for example a binary category has the attributes "success" and "failure".

Depending on an optimization goal (for the production process), other quality categories can be used as well. For example, using the mentioned batch run interval as criterion, batch-runs can be categorized into long or short batch-runs (further categories possible). Reference data can be used to estimate energy consumption (e.g., electrical energy, heat, compressed air) so that there batch-runs with "low", "medium" or "high" consumption. Reference data relating to events (such as failure of equipment components) can potentially assist in identifying batch-runs (and equipment parameters) that keep the equipment operational as long as possible and that avoid stress, wear etc. of the equipment.

It is noted that QR may not be known immediately after reference batch-run 210 ends, but may become available at a later point in time.

Similarly, production batch-run 220 resulted in production data in the form of multi-variate time-series {{P}}, but not yet in the quality category QP. It is desired to identify quality category QP as soon as possible, during production execution 220 (cf. FIG. 11) or shortly thereafter (cf. FIG. 1).

As illustrated by reference 431 (cf. FIG. 1), a calculation {{R}}©{{P}} can result in a similarity index S (or score). The operator © symbolizes known approaches, cf. the above-mentioned reference [1].

If similarity is determined (e.g., by comparing the index to a threshold, or otherwise), production batch-run 220 can be associated to QP with the same attribute (as reference batch-run 210). For example, for QR="success" and similarity between {{R}} and {{P}}, production batch-run 220 is associated with QP="success" as well.

The assumptions are simplified. In case of a binary indicator, similarity to a success-reference can lead to the association with success, but non-similarity to the success-reference does not automatically lead to the association with failure.

But the comparison is affected by the above-mentioned constraints.

FIG. 2 also illustrates computer-implemented method 400, at least partially. Method 400 comprises a sequence of converting steps 410/420 and comprises comparing step 430. Further steps are illustrated in FIG. 8. Comparing step 430 symbolizes a computer-implemented comparison between uni-variate time-series {R}# and {P}# (but not between multi-variate time-series). Comparing step 430 can comprise the calculation of similarity index S'.

The operator ©# symbolizes the use of a known approach for comparing step 430, but also the alternative use of further approaches (that are applicable to uni-variate time-series). Aligning the time-series can be part of the comparison.

Index S' can be used instead of index S to determine similarity (or non-similarity). Depending on quality category QR of the reference, quality category QP for the production batch-run can be identified as well.

As it will be explained in detail below (FIGS. 4-5), conversion 410/420 comprises multiplying data values with source-specific factors αv and summing up the multiplied values according to the discrete time points. In FIG. 2, multiplying is symbolized by "*", and summing up is symbolized by "Σv" (v=1 to V).

Conversion 410 results in converted reference time-series {R}# and conversion 420 results in converted production time-series {P}#, both being uni-variate time-series. Step 430 stands for computer-implemented comparison between these uni-variate time-series { }#, but not between multi-variate series {{ }} (as in 431).

FIG. 3 illustrates a table with an overview to further writing conventions that are applicable to batch-runs 210, 220 (cf. FIG. 1). Generally, data D can be differentiated into reference data R (relating to reference batch-run 210, cf. FIG. 1) and production data P (relating to production batch-run 220, cf. FIG. 1). The generalization into D is convenient because in some steps (such as conversion 410/420), data processing is similar.

Lowercase letters "d", "r" and "p" are used accordingly, for data values. The variate index v identifies data-sources by type (from v=1 to v=V) and can be common for R and for P. Time indices are generally denoted by "k" (from k=1 to k=K), or by "m" (m=1 to m=M) for reference data R and by "n" (for n=1 to n=N) for production data P. The differentiation is conveniently introduced due to potentially different intervals, as explained above. Batch-run intervals are denoted by [t1, tK] (in general) or [t1, tM] and [t1, tN] (in particular for R and for P).

Occasionally, for describing machine learning, the description uses R' and Q' instead of R, but data points would be called r and q (without the apostrophe).

FIG. 4 illustrates a block diagram of computer 600 (or computer system). As used herein, the term "computer" is given in singular, and the term "computer" generally stands for the entity that is adapted to execute the steps of computer-implemented methods. This convention is simplified.

More in detail, computer 600 can have different modules 603 and 604 that are specialized for the execution of particular step sequences (or particular methods, such as methods 300 and 400, cf. FIG. 8). Similarity module 604 is illustrated by two sub-modules 604-i and 604-ii. It is also contemplated that different modules (and/or sub-modules 601-i, 601-ii) can belong to different physical computers.

For convenience, modules are labeled according their main function: data repository (module) 650, factor module 603 and similarity module 604.

Data flows (with input and output data to the modules) will be explained in the following. For simplicity, the FIG. 4 illustrates only some data flows: pre-processing modules 630 and repository 650 provide time-series: {{R'}} and {{Q'}} to factor module 603 and {{R}} and {{P'}} to similarity module 604. Factor module 603 provides conversion factor vector 610* to similarity module 604, and similarity module 604 provides a quality category QP.

Figure 5:
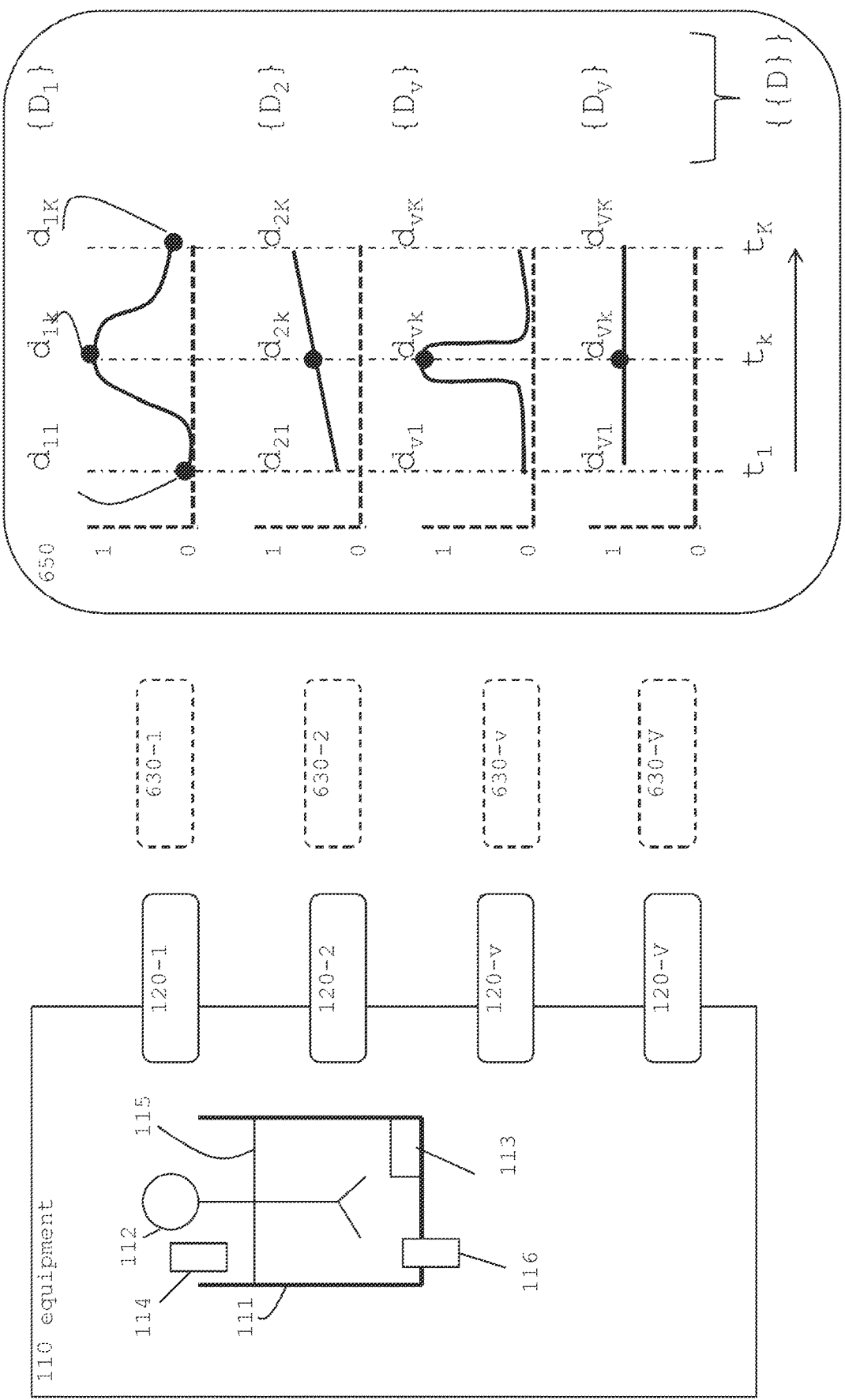
FIG. 5 illustrates technical equipment that performs the production process, wherein data in a multi-variate time-series is one of the results.

FIG. 5 illustrates technical equipment 110 that performs production process 200 (i.e., a "batch run"), wherein data in a multi-variate time-series is one of the results. As FIG. 5 is applicable for reference batch-run 210 and for production batch-run 220 (also for 210-R' and 210-Q' in FIG. 1), the illustration refers to data by the general acronym D. FIG. 5 also illustrates collecting data from data sources 120 during the performance of production process 200.

The figures and the description are simplified. As used herein, technical equipment 110 (performing reference batch-run 210) and technical equipment 110 (performing production batch-run 220) can be physically the same equipment. This is convenient, but not required. It is also contemplated that technical equipment can be different, for reference and for production batch-runs. The same principle is applicable for reference batch-runs R' and Q', cf. FIG. 1.

In other words, technical equipment that provides data that is used as reference data can be called "reference equipment"; and technical equipment that provides data that is to be compared with the reference is called "production equipment". Since the terminology differentiation into "reference" and "production" is a relative differentiation (and not an absolute one), a production batch-run can be used as reference in the future.

Pre-processing data by modules 630 is optional and comprises normalizing. Data is made available as data values dvk in data repository 650. Computer 600 (i.e. factor module 603 and similarity module 604) has access to data repository 650 (e.g., repository in part of computer 600). Data repository 650 is implemented by computer memory and/or a database, known in the art. Collecting data is performed before modules 603 and 604 receive data (cf. FIG. 8).

By way of example, equipment 110 is illustrated as comprising tank 111 with motor/mixer 112 that stirs liquid 115, with heater 113 that heats up liquid 115, and with valves 114/116 that allow adding (or removing) liquid 115.

Equipment 110 is also illustrated with a number of V data sources 120-1, 120-2 ... 120-v ... 120-V (collectively "data sources 120"). The number V corresponds to the "multi-variate". For technical equipment 110 being industrial equipment, data becomes available from different types of sources, among them:
- sources that provide measurement values (e.g., rotation speed of the motor, temperature of the liquid, amount of liquid, data from a laboratory and so on),
- sources that provide control instructions (e.g., to open a valve to add liquid, to close the valve etc.), or
- sources that provide status indicators (e.g., a particular valve being open, or being closed).

Data sources 120 can be implemented differently. For example, measurement values and status indicators do usually come from sensors. Or, the control instructions can come from a controller computer (not illustrated) that controls the operation of equipment 110. There is no need that data sources 120 are physically connected to equipment 110.

During the batch-run, data sources 120 provide data values dvk (with index v identifying a particular data source 120-v and index k identifying discrete time points tk)

The batch-run has a temporal length (i.e. duration) of the interval [t1, tK] that includes time points, with
- time point t1 with index k=1 at the beginning of the batch-run, and
- time point tK with time k=K at the end of the batch-run.

Assuming that data is not yet collected before t1 and no longer collected after tK, the batch run duration can be calculated as tK−t1.

Different data sources 120 may provide data at different points in time. For example, sensors may use different sampling rates (e.g., sensing the temperature every minute vs. sensing the rotation every second). Or, status indicators may become available when a particular event has occurred (that changes the status, e.g., the valve from status "closed" to status "open").

Persons of skill in the art can use interpolation/extrapolation techniques to normalize the time to common Δt (as a consequence common K as well, common abscissa). Interpolation/extrapolation can be performed by optional pre-processing modules 630 (for v=1 to V=V separately).

Persons of skill in the art can normalize the values as well (common ordinate). In the example, data values dvk have been normalized to numeric values between 0 as the minimal value and 1 as the maximal value. Normalizing removes measurement units and other information that can be associated with the data. Normalizing can use min/max values (with units). For example, for a motor with the maximal rotational speed 60 cycles per minute, the normalized extremes are dvk=1 for maximal rotation and dvk=0 for stand-still. Status data can be normalized, for example, dvk=0 for "valve closed" and dvk=1 for "valve open". Normalizing can be performed by optional pre-processing modules 630, or otherwise.

Data values dvk can have a negative sign as well (dvk<0), but in this example this is not illustrated.

Looking at data repository 650 that store the data values dvk, the figure illustrates them by dots belonging to graphs (or "trajectories") with [0,1] values at the ordinate and the time [t1, tK] at the abscissa. The figure illustrates 3 dots per time-series only. The trajectory is the line that connects the dots. Trajectories are convenient notations, but it is again noted that data values dvk are available for discrete time points tk.

As in the following, a uni-variate time-series with data from source 120-v will be represented by {Dv} with (normalized) data values {dv1 ... dvm ... dvM} for consecutive time points in the interval [t1, tK]. {Dv} can also be written as a matrix with V columns and K rows (or V rows, and K columns) {Dv} is a uni-variate time-series.

At the granularity level of technical equipment 110, multi-variate time-series {{D}} refers to the collection of uni-variate time-series {Dv} that belong to a particular batch-run (210, or 220) of production process 200. The set can be noted as {{D}}={{D1} ... {Dv} ... {DV}}.

In the example, multi-variate time-series {{D}} is given as set of uni-variate time-series {D1}, {D2}, {Dv}, and {DV} with data values dv1, dvk, and dvK at representative time points t1, tk and tK, respectively. The other data values are symbolized by connecting lines. The uni-variate time-series have characteristics, such as in the following example:
- {D1} has representative data values d11=0, d1k=1 and d1K=0.1 standing for a measurement value rising to a max value and falling to an end value. {D2} has representative data values d21=0.2, d2k=0.5 and d2K=0.8 standing for an substantially linearly rising value. It is noted that a maximal value 1 does not have to be reached. {Dv} has representative data value dv1=0.1, dvk=1 and dvK=0.1 standing for an event with a peak occurring approximately at tk. {DV} has representative data values dV1=1, dVk=1 and dVK=1 standing for status that is unchanged during the process.

In case that {{D}} is reference {{R}}, similarity to {{P}} has to be detected by these characteristics into account. For example, the rise in {R1} would occur in {P1}, the peak in {Rn} would occur in {Pn} and so on. However, characteristic patterns (such as rise or peak) do not occur at the same time (cf. the first constraint). Further, operating multi-variate time-series {{D}} implies the second constraint, as explained above.

Figure 6:
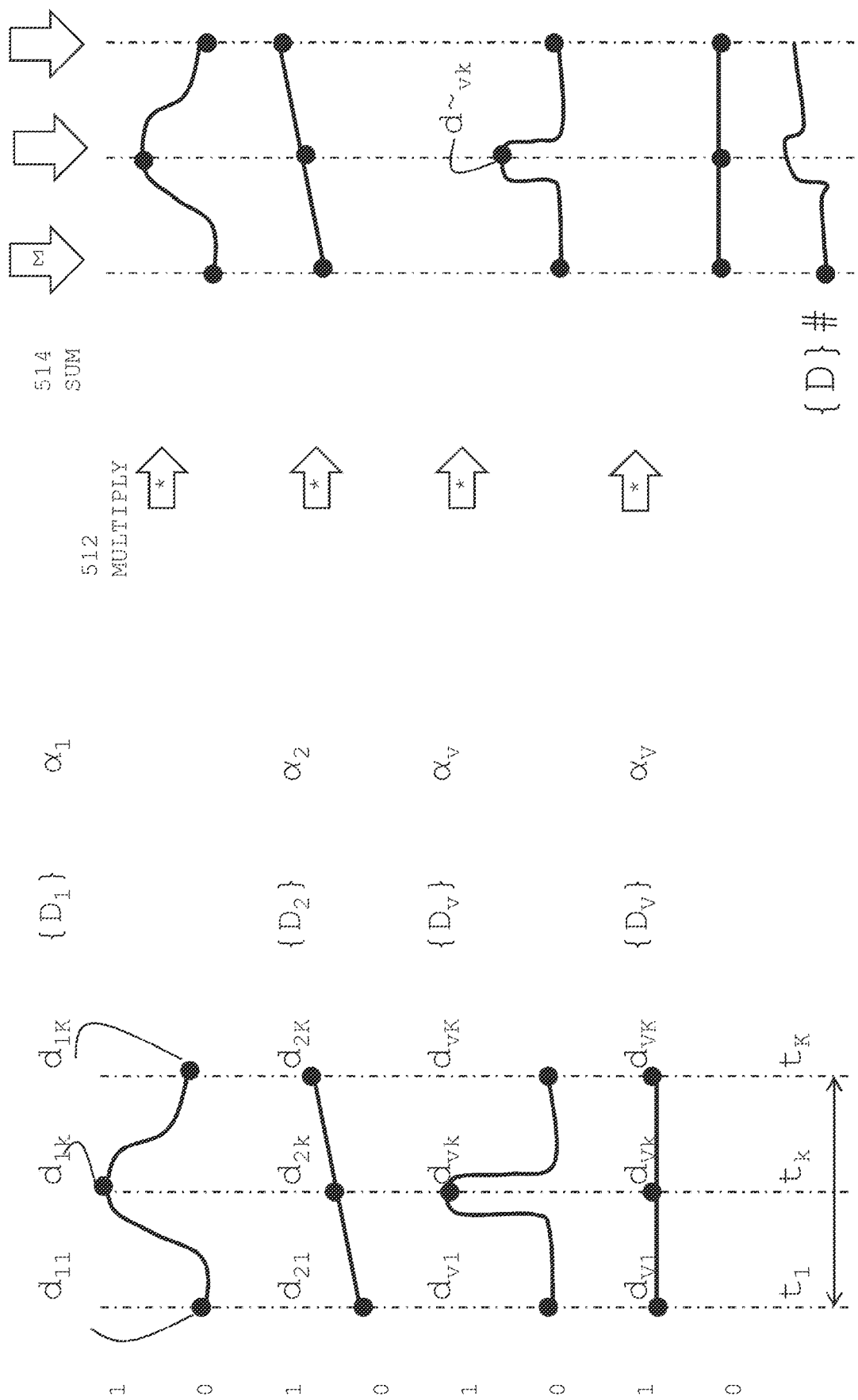
FIG. 6 illustrates a computer executing method steps to convert a multi-variate time-series to an uni-variate time-series, with using source-specific factors.

FIG. 6 illustrates computer 600 that executes method step 410/420 to convert multi-variate time-series {{D}} to uni-variate time-series {D}#, with using source-specific factors αv. The conversion is explained in general, with the conversion {{D}} to {D}# standing for the conversions {{R}} to {R}# and {{P}} to {P}#, as the case may be. (It is noted that the conversion is also applicable to step 310, FIG. 8. Reference 600 is taken in general because conversion can be executed by modules 603 and 604).

Conversion 410/420 comprises the sub-steps multiplying 512 and summing up 514.

The figure shows time-diagrams (simplified, ordinate and abscissa axis taken out) for the input (i.e. {{D}}), arrows to the right for multiplying step 512, time-diagrams for intermediate results (i.e., such as multiplied time-series with multiplied data values), arrows pointing down for summing up step 514, and a time-diagram for the result (i.e., {D}#).

In first sub-step 512, computer 600 multiplies values dvk with pre-defined source-specific factors αv, to multiplied values d~vk (i.e. multiplied values) that is:

d~$_{vk}$=d$_{vk}$*α$_v$. The multiplication is applicable to k=1 to k=K likewise, there is no change of α$_v$ over k.

The factors can be summarized in the above-mentioned conversion factor vector 610* (cf. FIGS. 1 and 4) and can also be noted as (α1, α2 . . . αv. αV).

In the example, multiplication of {D1} by factor α1=0.5 leads to multiplied time-series {D1}~, multiplication of {D2} by factor α2=2 leads to multiplied time-series {D2}~; multiplication of {Dv} by factor αv=0.5 leads to multiplied time-series {Dv}~; and multiplication of {DV} by factor αV=0.1 . . . leads to multiplied time-series {DV}~.

In second sub-step 514, computer 600 sums up the multiplied time-series, by summing up there multiplied values d~vk according to discrete time points, that is d #k=Σd~vk.

The sum symbols Σ is understood to be sum from v=1 to v=V. Summing up results in converted time-series:

{D}#={Σd~$_{v1}$ . . . Σd~$_{v2}$ . . . Σd~$_{vk}$ . . . Σd~$_{vK}$}=
{d #$_1$ . . . d #$_2$ . . . d #$_k$ . . . d #$_K$}.

Converted time-series {D}# is illustrated below, at the right side of the figure. {D}# is uni-variate. {D}# can be regarded as an overlay series from multiple series {Dv} that are added.

Looking at the graph of {D}#, it has a characteristic curve, or—metaphorically—a characteristic "signature". As it will be explained below, "signatures" can be considered as sequences of characteristic shapes.

This signature retains most of the characteristics of the originating multi-variate time-series {{D}}. The signature does not retain all characteristics, but retains sufficient characteristics to perform comparison 430.

In the example, {D}# has inherited the rise to max (from {D1} and {Dv}, and has inherited the gradual increase from {D2}. It has also inherited the status of {DV}, although with lower contribution to the signature.

Shortly returning to the introduction of conversion factor vector 610* above in FIG. 1, manually evaluating data, such as reference data {{R}} is possible. Simplified, the factors amplify or reduce the contribution of individual time-series. In the example, the person of skill in the art can evaluate time-series {Dv} having substantially constant values. The contribution to the signature of {D}# can be neglected, hence factor αV could be set to 0.

But before explaining the factors α in the ML alternative, the description shortly looks at the above discussion with FIGS. 1-2. Converting step 410 can be applied to data {{D}} from multiple batch-runs 210, 220 of production process 200, resulting in {{R}} and {{P}}, respectively. Similarity S' can be detected as explained (in FIG. 2). In other words, if the converted time-series from data of two executions are similar, the quality category can be assumed to be the same as well.

For example, batch-run 210 (reference) has the quality category "success" and results in {R}# (as {D}# as in FIG. 5). Batch-run 220 (production) results in {P}# that looks like a parallel line. Similarity would therefore not be detected. The quality category "success" would not be assigned (to the particular production execution).

In the alternative, conversion factor vector 610* can be obtained from manual evaluating reference data {{R}}.

Before explaining details for obtaining factors α of conversion factor vector 610, the description discusses a use-case.

Figure 7:
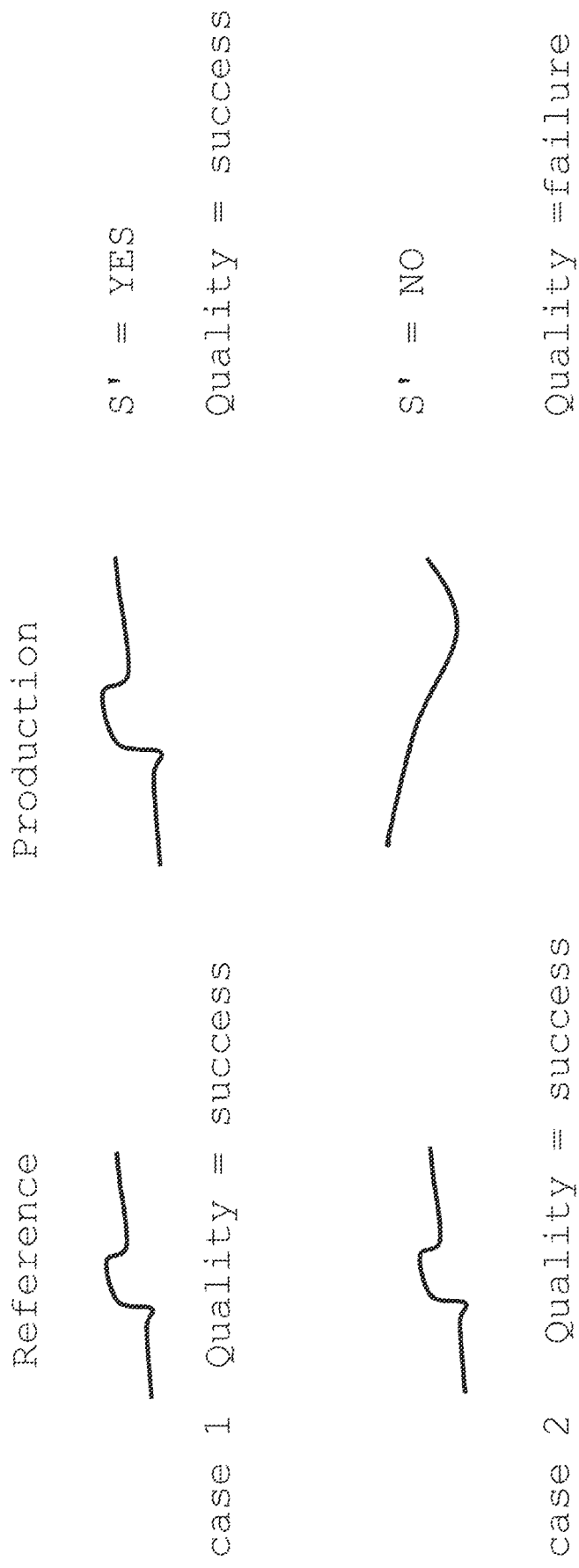
FIG. 7 illustrates the evaluation of converted time-series resulting from reference batch-runs and production batch-run, wherein the converted time-series are uni-variate time-series.

FIG. 7 illustrates the comparison of converted time-series that result from reference batch-runs and from production batch-runs, wherein the converted time-series are uni-variate time-series.

In a first case, reference batch-run 210 has the quality category "success", and has a characteristic signature (cf. {D}# in FIG. 5). Production batch-run 220 has a characteristic signature that is similar. The signature appears "longer" because production batch-run 220 took longer time to complete (than reference batch-run 210). Due to the similarity (S'=YES, cf. FIG. 2), the same quality category ("success") is assigned to production batch-run 220 as well. The person of skill in the art can compare such signatures, even if their length is different. The comparison can comprise the calculation of similarity indices or the like. Appropriate tools are available (cf. reference [1]).

In a second case, reference batch-run 210 is the same as in the first case, but production batch-run 220 has a characteristic signature that is different. The figure illustrates non-similarity by a different graph. Non-similarity (S'=NO) in combination with a binary category results in "failure".

FIG. 7 (and other figures) uses signatures in trajectories to enhance understanding, but the person of skill in the art does not have to draw the trajectories.

In the example of FIG. 5, the factors α$_v$ are used such that the characteristic of the signature in {D}# remains. To stay with the example of FIG. 5, factor α$_v$=0.5 keeps the increase of {D$_v$} in multiplied time-series {D$_v$}~ to be large enough for a "visibility" in converted series {D}#. In other words, the factors are selected such that the conversion is robust to determine similarity indicating of particular quality categories. The following explains how the factors can be obtained.

The involvement of the expert user is optional, and the involvement does not require the expert to identify the factors.

FIG. 8 illustrate flow-chart diagrams for computer-implemented methods 300 and 400.

Method 300 is a method for obtaining factors by machine learning (i.e. the factor method), and method 400 is a method for determining similarity (or non-similarity) for particular batch-runs of production process 200.

Both methods describe step sequences that can be performed by different computer modules, factor module 603 and similarity module 604, respectively, cf. FIG. 4.

It is convenient to start with method 400 because some of the steps have already been explained.

Also, as illustrated by dashed rectangles, method 400 can be differentiated into computer-implemented methods 401 being the reference method and method 402 being the production method.

To execute method 400 (with methods 401 and 402), similarity module 604 needs conversion factor vector 610*, cf. FIG. 4. As mentioned, conversion factor vector 610* can be obtained through ML from factor module 603, executing method 300. In the alternative, conversion factor vector 610* can be obtained from manually evaluating reference data {{R}}.

By method 401 (with step sequence 405 and 410), a reference sub-module of similarity module 604 provides a reference for a particular quality category for reference batch-run 210 of production process 200 (or for a product that results from the reference batch-run 210). The reference has the form of a converted time-series {R}#.

In method 402 (with step sequence 415, 420 and 430), a production sub-module of similarity module 604 determines the quality category for production batch-run 220 of production process 200 (or for a product that results from the production batch-run 220).

The differentiation of method 400 into methods 401 and 402 is convenient for situations in that the reference {R}# is stored for relatively long time, and for situations in that one and the same references {R}# serves as reference for comparing different production data, potentially received from production equipment from other production sites.

In step receiving 405, similarity module 604 receives the data, for example, from data repository 650 (cf. FIGS. 5-6) as {{R}}.

In step converting 410, similarity module 604 converts multi-variate reference time-series {{R}} to converted reference time-series {R}#, as explained with sub-steps 512 and 512 (cf. FIG. 6), using conversion factor vector 610*. Similarity module 604 can store {R}# in data repository 650, or elsewhere.

In optional step reading 412, similarity module 604 reads (i.e. receives) converted reference time-series {R}#, from data repository 650 or from elsewhere. It is noted that reading 412 is introduced here only for convenience of explanation. In case that sub-module 604-i (for method 401) and 604-ii (for method 402) are implemented on the same physical computer, reading just comprises accessing data in memory.

In step receiving 415, similarity module 604 receives multi-variate production time-series {{P}}, for example from data repository 650 (cf. FIGS. 4-5) or (without intermediate storage) from equipment 110 (cf. FIG. 5 as well).

In step converting 410, similarity module 604 converts multi-variate production time-series {{P}} to converted production time-series {P}#, as explained with sub-steps 512 and 512 (cf. FIG. 5), using conversion factor vector 610*, i.e. using the same factor vector.

In step comparing 430, similarity module 604 compares {R}# with {P}# (i.e. compares the converted reference time-series and the converted production time-series). Thereby, the similarity module can use a time-warping (i.e. a time-warp operation). The person of skill in the art can apply time-warping and can review reference for further details. Using other approaches, such as optionally the approach according to FIG. 13 is also contemplated.

As mentioned above, retaining the characteristics during the conversion (in steps 410 and 420) is a condition for comparing step 430.

The description now gives an overview to method 300, executed by factor module 603. In view of FIG. 1, the description changes the acronyms.

In step 305, factor module 403 receives reference data, from at least two reference batch-runs 210-R and 210-Q', cf. FIG. 1. (It is noted that Q' is not the same as Q). This step can be performed like steps 405 or 415 (e.g., R instead of R, Q' instead of P).

In the following, reference data will be labelled R' and Q', such as for the first multi-variate time-series {{R'}} and the second multi-variate time-series {{Q'}}. The first multi-variate time-series {{R'}} comprises—at least—first (uni-variate) time-series {R'1} with data from first source 120-1 (cf. FIG. 5), and second (uni-variate) time-series {R'2} with data from second source 120-2. The second multi-variate time-series {{Q'}} comprises—at least—first (uni-variate) time-series {Q'1} with data from first source 120-1, and second uni-variate time-series {Q'2} with data from second source 120-2. More in general, {{R'}} and {{Q'}} both comprise V uni-variate time-series from the V sources.

In step 310, factor module 603 determines the characteristics by
  determining 311 characteristic portions of univariate-time-series, and
  determining 312 relations between characteristic portions.

In the following figures, the characteristic portions (of the time-series) will be illustrated as characteristic portions (labelled ①②③), and the relations will be illustrated by dashed arrows (between the characteristic shapes). The sequence of the characteristic shapes is the signature (of the particular batch-run). Occasionally, step references 311 and 312 are added to the figures.

The number $\Omega$ of characteristic portions that are related (steps 311/312) is smaller than K. This number $\Omega$ can be different for time-series from different sources. In the examples below, the number is $\Omega=1$ for the first example, the number is $\Omega=2$ (for the second example, portions ①②) and is $\Omega=3$ (for the third example ①②③).

Looking from a different perspective, in step 310, factor module 603 identifies a goal how to relate the time-series. Factor module 603 executes the following steps 320-350 for candidate factor vectors that are different.

Applying the candidate factor vectors can be implemented by repeating steps 320-350 (i.e., in a loop for F vectors), by performing step 320-350 in parallel (i.e. by parallel operating sus-modules) or by a combination thereof. Applying the candidate factor vectors stops when in step 360 an evaluation shows that the characteristics remain despite the multi-to-uni-variate conversion. The description of FIG. 8 assumes the implementation with the repetitions.

In step 320, factor module 603 selects factors, in a candidate factor vector ($\alpha$1, $\alpha$2) with at least two factors: the first factor $\alpha$1 for the (uni-variate) time-series {R'1} and {R'2} as well as the second factor $\alpha$2 for the (uni-variate) time-series {R'2} and {Q'2}, with data from first source 120-1 and second source 120-2, respectively.

The initial selection of the candidate factor vector can be random selection.

In step 330, factor module 603 converts the first multi-variate time-series {{R'}} and the second multi-variate time-series {{Q'}} to converted first time-series {R'}# and converted second time-series {Q'}#. Thereby, factor module 603 applies sub-steps 512 (multiply, using the candidate factor vector) and 514 (sum up) accordingly (cf. FIG. 5).

In step 340, factor module 603 aligns converted first time-series {R}# with converted second time-series {Q'}#. Factor module 603 thereby uses DTW (cf. reference [1]). Thereby, data values of the converted second time-series {Q'}# are aligned to data values of the converted first time-series {R}#. This can be implemented by assigning new time point indices to some of the data values of {Q'}#. Aligning can be considered to comprise the determination of characteristic portions (of univariate-time-series) and the determination of relations. More in detail, as a result of alignment step 340, at least some of the data values are assigned to a time-interval that is different from the time-interval of the batch-run (i.e., 210-Q').

In step 350, factor module 603 measures portion-specific alignment displacements $\Delta T$. As used herein, the displacement is the distance—measured in time point indices—between the original time point of a characteristic portion of {R'v} (determined in step 310/312) and the aligned time point of the characteristic portion of {Q'v} that have been related (determined in step 310/314).

Measuring the ΔT is performed for substantially all characteristic portions and their relations (number Ω).

In step 360, factor module 603 evaluates the portion-specific displacements ΔT by summing them up (ΣΔTω) (ω=1 to Ω). Conversion factor vector 610*  is the vector for that the sum is smallest.

Optionally, the sum is calculated as the sum of the absolute values Σ|ΔTω|.

Although FIG. 8 illustrates factor module 603 executing steps 320, 330, 340 and 350 in repetitions (for factor vectors that are modified), factor module 603 can execute the steps in parallel as well (FIG. 8 illustrates the step with multiple boxes as well).

It is noted that repetitions do not necessarily decrease the displacements (ΔT) and/or their sums. It is therefore advantageous to store the displacements (ΔT) in relation to the candidate factor vectors, at least as long as the conversion factor vector is not yet identified.

FIG. 8 also illustrates one or more computer programs or computer program products. The computer program products—when loaded into a memory of a computer and being executed by at least one processor of the computer—perform the steps of the computer-implemented method. So in other words, the blocks in FIG. 8 illustrate that the method can be implemented by modules under the control of the program. The person of skill in art can choose an appropriate assignment of methods to computer modules, as in the example, method 300 to factor module 603, method 400 to similarity module 604 (step-sequences by sub-modules).

Figure 10A:
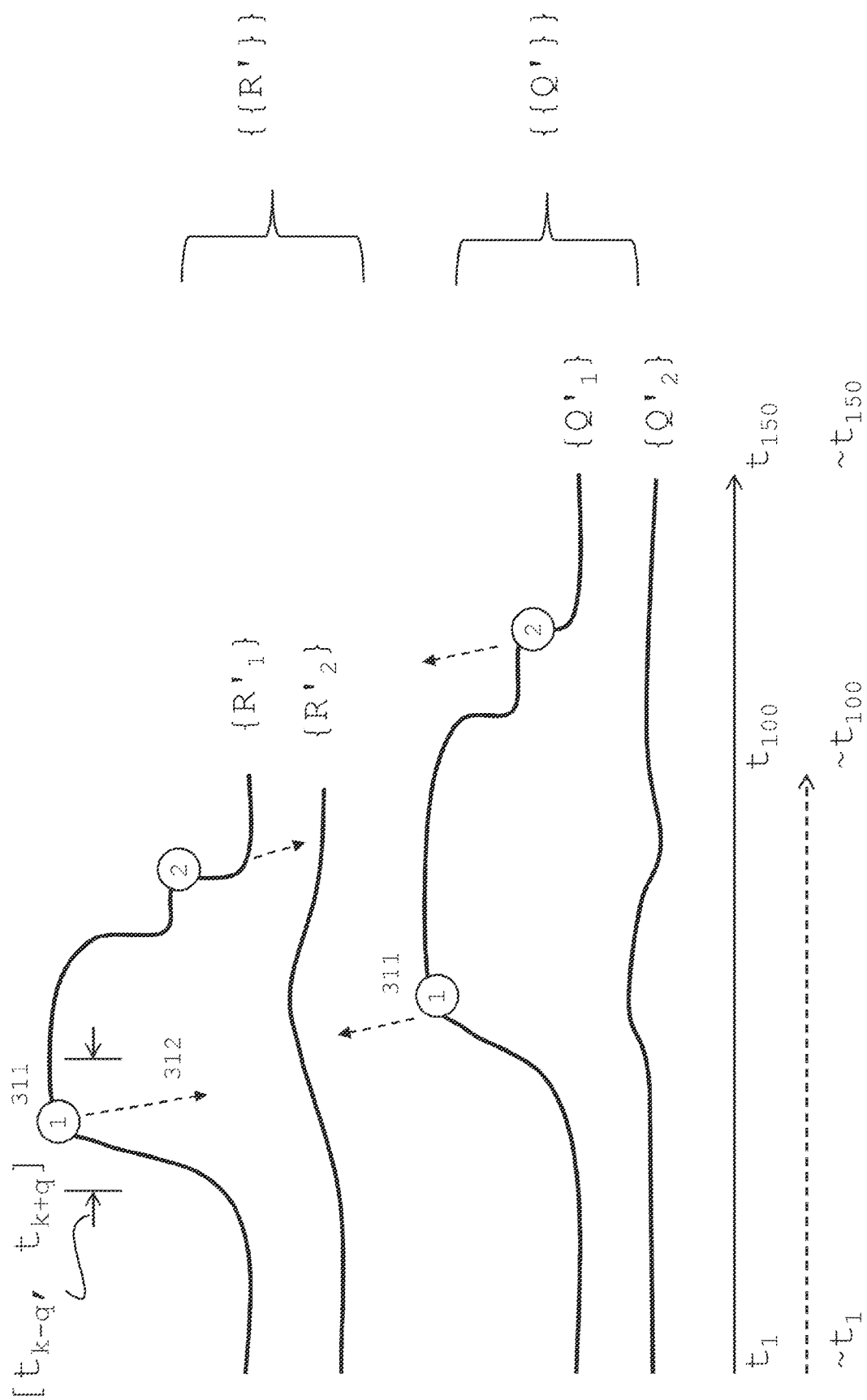
Figure 10B:
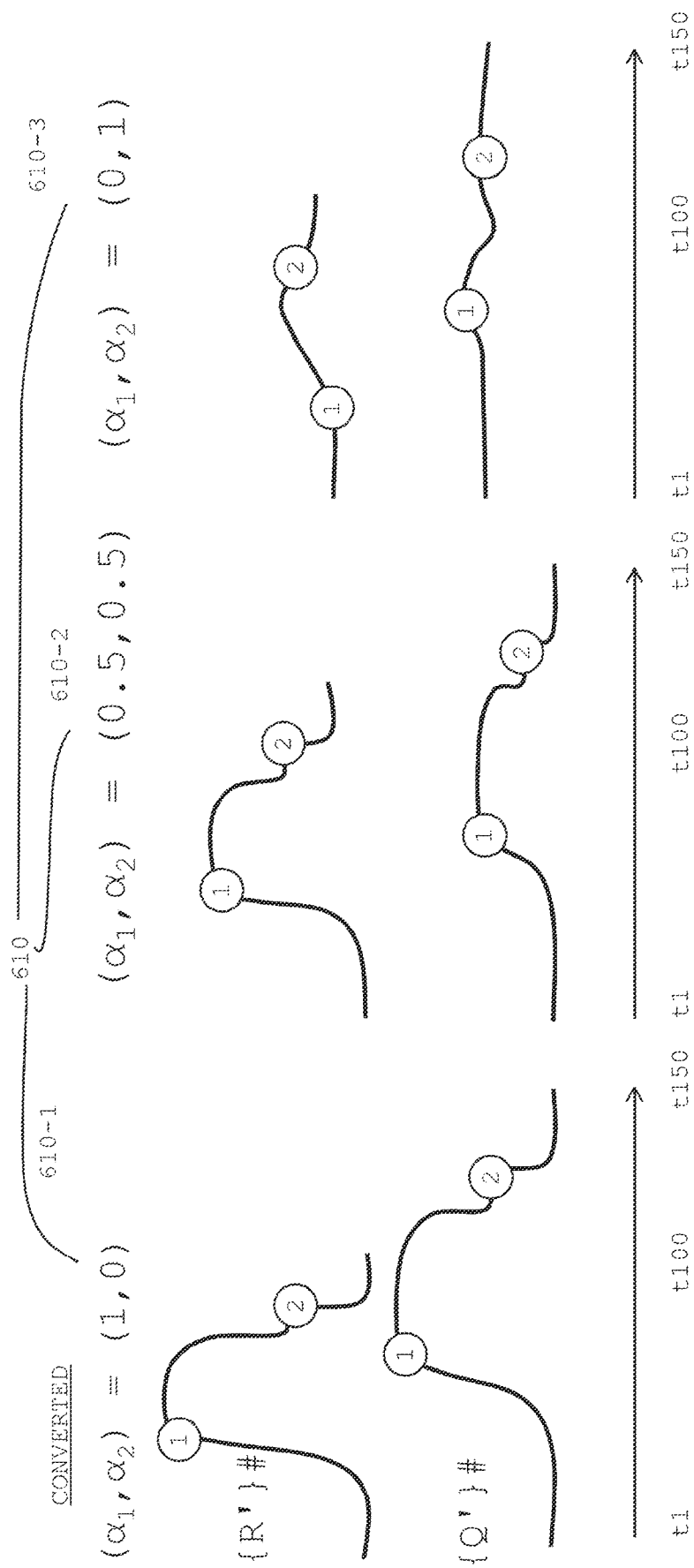
Figure 10C:
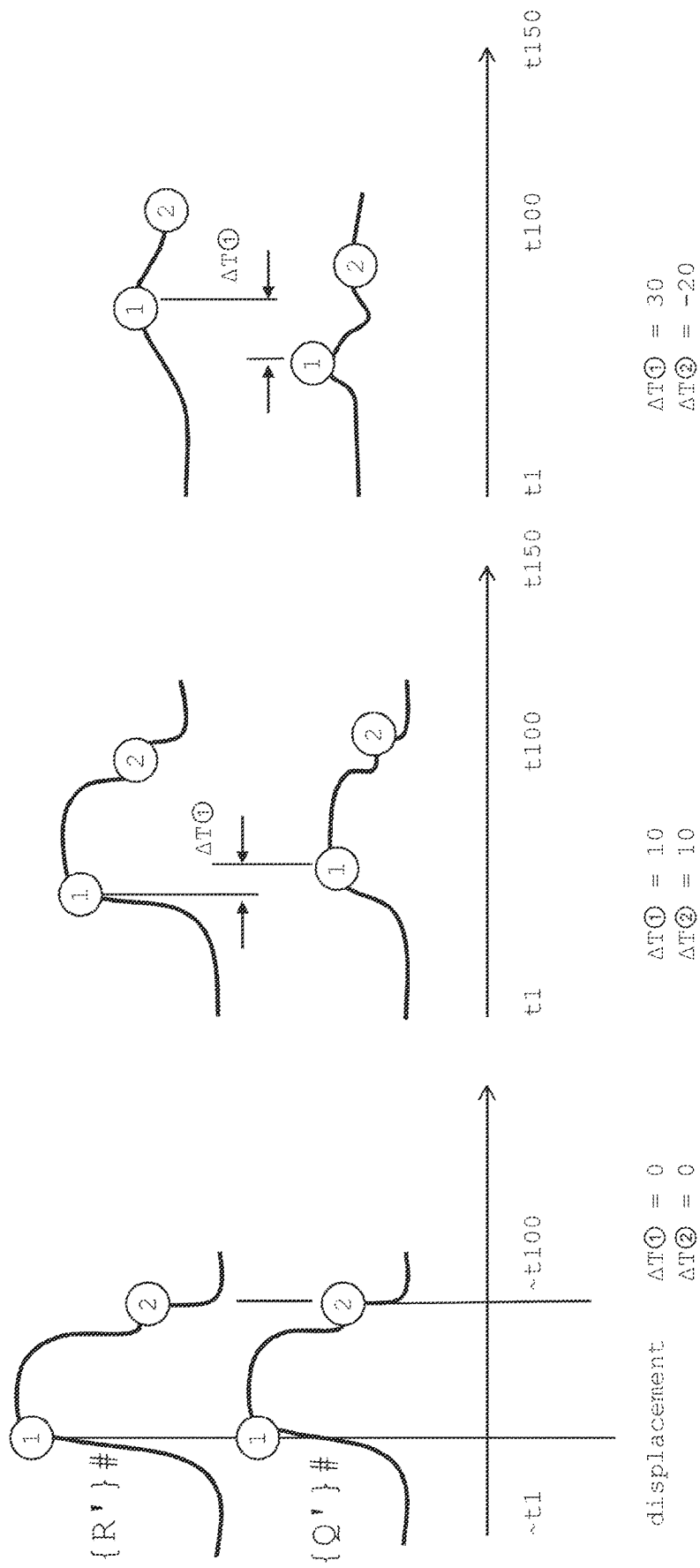
Figure 11:
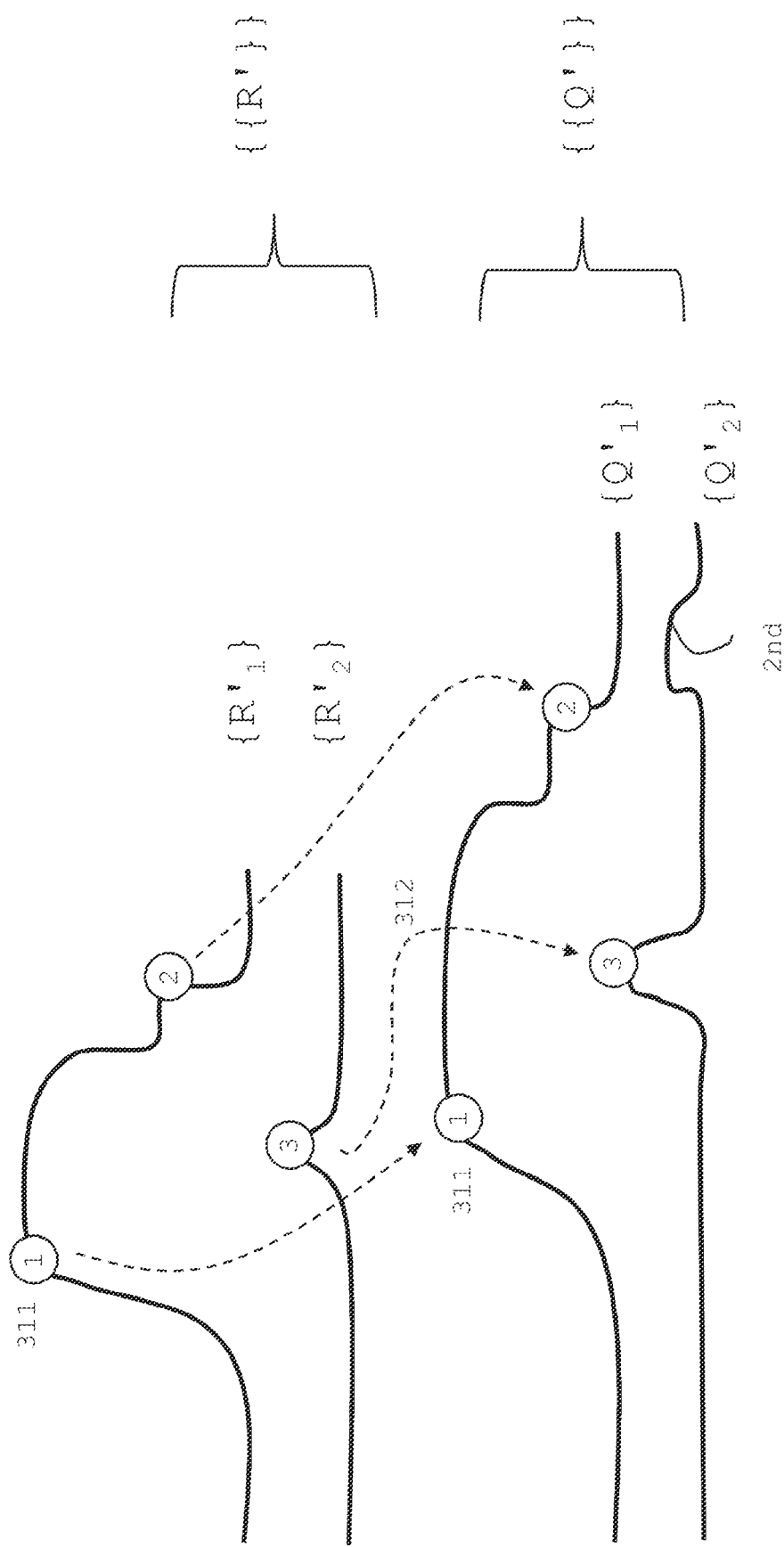

FIGS. 9-11 illustrate the trajectories of time-series to explain machine learning (ML) to obtain source-specific factors αv by way of example. For the illustrative examples, technical equipment 110 has performed production process 200 two times, in two (or more) reference batch-runs 210-R' and 210-Q', i.e. batch runs, cf. FIG. 1. The illustrations are much simplified. In reality, there are more than two batch runs.

Form reference batch-runs 210-R and 210-Q', at least two multi-variate time-series are available, in the example the multi-variate time-series {{R'}} and {{Q'}}. The figures illustrate the trajectories from left to right.

It is noted that the sources (cf. sources 120 in FIG. 5) are not necessarily differentiated according to their types. In other words, it does not matter if the sources provide measurement values, control instructions, or status indicators.

The multi-variate time-series are illustrated by their trajectories as {{R'}} (usually above) and {{Q'}} (below).

Reference batch-runs 210-R and 210-Q share the same quality category, such as, for example, QR="success". It is not necessary that reference batch-runs 210-R' and 210-Q' result in the same data. Data is usually different. For example there is a difference in the duration and/or in the data values.

FIG. 9 illustrates a first example. For convenience, lines are numbered. For simplicity, for this illustrative example the following is assumed:

Reference batch-runs 210-R' and 210-Q' result in data values that can only be 1 or 0.

A sequence of data values (0, 1, 0) at first, second and third consecutive time points [tk−1, tk, tk+1] is a "peak".

There are K=10 time points, from [t1, tK]=[1,10], for both batch-runs, as in line 0.

The batch-runs are similar (and having the same quality) if the data from first source 120-1 shows at least one peak in both batch-runs, no matter when (similarity criterion).

As mentioned, both reference batch-runs 210-R' and 210-Q' are similar, and method 300 provides conversion factor vector 610* that can be used (in method 400) to determine similarity (or non-similarity for subsequent batch-runs, cf. batch-runs 210 (reference) and 220 (production). But again, similarity between 210-R' and 210-Q' is assumed.

Lines 2 and 4 show bi-variate time-series {{R'}}. As in line 2, {R'1} has a particular data value as r12=1, wherein the other data values should be zero (illustrated by dots). In other words, the data from first source 120-1 has a peak that is centered at t2. As in line 4, {R'2} has particular data value r28=1, and is otherwise zero. In other words, the data from the second source 120-2 has a peak centered at t8.

As in lines 6 and 8, second reference batch-run 210-Q' resulted in a peak q15=1 in {Q'1} and in two peaks q23=1 and q27=1 in {Q'2}.

As illustrated by underscoring, factor module 603 determines characteristic portions. Some of the peaks are also characteristic portions, but not all. In the example, pre-defined rules to determine the characteristic portions and to relate the characteristic portions are derived from the similarity criterion.

In this simplified example, the pre-defined rules are therefore to identify the at least one peak in each of {R'1} and {Q'1}, and to relate the first occurring peaks with each other, relate the second occurring peaks with each other, and so on. FIG. 9 illustrates an example with one peak only, but that does not change the rule.

According to the pre-defined rules, the peak in {R'1} centered at time-point k=2 (data from first batch-run R') is related to the peak in {Q'1} centered to k=5. The data from second source 120-2 is ignored, because the pre-defined rule is not related to this source.

The relation between the characteristic portions (i.e., peaks) is illustrated by a dashed arrow. It is noted that determining characteristic portions also "de-classifies" other portions. In the example, the data from source 120-2 is "de-classified".

The description ignores the characteristics for a couple of words and explains the next step: As in lines 10 and 12, factor module 603 selects candidate factor vector (1, 0) (vector 610-1, step 320). In the example, the selection is a random selection. The reason for starting with candidate factor vector (1, 0) is just convenient to keep this description short.

Factor module 603 converts {{R'}} to {R'}# and converts {{Q'}} to {Q'}# (step 330, cf. sub-steps 512, 514). Factor α1=1 keeps the peaks in {R'1} and in {Q'1} and factor α2=0 removes the peaks from {R'2} and in {Q'2} Summing up leads to converted {R}# with value 1 at time-point k=2 and converted {Q'}# with value 1 at time-point 5. So far, nothing has been shifted in time.

As in line 14, factor module 603 has aligned (step 340) {R'}# and {Q'}#. In the example, the alignment keeps the time-slots in the interval [1, 10] for {R}# and re-assigns at least some data values of {Q'}# to other time-points, in the example, by shifting the value 1 from time-point 5 to time-point 1. This results in shifted converted time-series that has been aligned to converted time-series {R'}#. (The ~ symbol indicates that the time-scale was changed).

This alignment does not ignore the history: In the figure, the shifted value 1 (in {Q'}#~ is still illustrated by underscoring. In other words, factor module 603 tracks that this value has been identified earlier (in step 310). Factor module 603 also tracks the relation (cf. the arrow).

In step 350, factor module 603 now measures the portion-specific displacement $\Delta T$ (or shifting) of the relation, being the time-distance between R' and Q'. The displacement is portion-specific because it relates to the first relation (of the first characteristic portion in {R'1} to the first characteristic portion in {Q'1}). In the example, there is only one characteristic portion and one relation ($\Omega=1$).

In the example, $\Delta T$ is zero, because the identified values (value 1 at time-point 2 in {R'1} and value 1 from original time-point 5 in {R'2}~ are now at the same time-point.

In step 360, factor module 603 evaluates the displacement. As explained above, factor module 603 calculates the sum of the displacements. In the simplification $\Omega=1$, summing up can be skipped. In the example, the zero displacement stands for a situation that is ideal due to the simplification. Zero displacement means that factors vector (1, 0) (reference 610-1) becomes conversion factor vector 610\* (cf. FIG. 4). Factor module 603 continues with providing step 370 (and provides conversion factor vector (1, 0) for use in method 400).

To be more accurate, a peak (as a sequence of (0, 1, 0)) requires also zero-displacement for the data values before (0, 1, . . . ) and after ( . . . , 1, 0) the 1 in the center, but this is in compliance as well.

To summarize the example, the occurrence of the peaks remains in the converted time-series, so that converted time-series can be converted by factors (1,0).

As the initial values for the factors do not matter, factor module 603 could have random-selected candidate factor vector (1,1) in step 320. The conversion (step 330) would have led to converted time-series {R}# and {Q'}# as in lines 16 and 18. In the aligning step, factor module 603 would have shifted {Q'}# by one position to the left. However, in view of the history, the 1 at k=3 is not the same as the identified value (the underscored one). The portion-specific displacement $\Delta T$ would be larger. Factor module 603 would have to repeat the steps, cf. FIG. 8.

FIG. 10 illustrates a second example, again in view of the flowchart for method 300 in FIG. 8. FIG. 10 has 3 parts: FIGS. 10A, 10B and 10C. Compared to the first example (of FIG. 9), the second example is more sophisticated, for example, in the following:

The batch-runs {{R'}} and {{Q'}} result in data values that are real positive numbers between 0 and 1. For simplicity, the ordinate is left out.

There are characteristic portions, in the figure identified by circle symbols ① and ②. Portion ① should be centered around time point $t_K$ in the interval $[t_{K-\lambda}, t_{K+\lambda}]$ (indices kappa and lambda).

Batch-run {{R'}} resulted in data values from the interval $[t_1, t_{100}]$, and batch-run {{Q'}} took more time, in interval $[t_1, t_{150}]$.

As in FIG. 10A, multi-variate time-series {{R}} comprises uni-variate time-series {R'1} and {R'2} and multi-variate time-series {{Q'}} comprises uni-variate time-series {Q'1} and {Q'2}. Looking at {R'1}, the values (from source 120-1) slightly increase until approximately t30, sharply increase until tK=t40, remain substantially constant until t65 (① in [t30−10, t30+10]) decrease sharply until t70, remain substantially constant until t80, drop again (②) centered at t85 and remain constant. Looking at {Q'1}, the values show a similar increase/rise/decrease etc. pattern, but more stretched in time: ① centered to t65 and ② centered to t125.

Still in FIG. 10A, factor module 603 executes step 310 and thereby determines the characteristics by determining 311 characteristic portions ① and ② of univariate-time-series {R'1}, {Q'1} and by determining 312 relations between characteristic portions (cf. the dashed arrows).

Factor module 603 can split the time-series into the portions according to pre-defined rules. Classifying properties of time-series by investigating the trajectories is well known (e.g., as "curve sketching"). In the example of portion ①, factor module 603 has determined (and related) characteristic shapes by determining inflection points (i.e., where the second derivative of the trajectory changes its sign.

It can be further assumed that—in an alternative—factor module 603 can have performed the determination through interaction with the expert user. The expert user has visually inspected the time-series and has annotated them. Graphical tools to show trajectories and tools to obtain input from the user are available in the art. As mentioned, in illustrations with trajectories the characteristic portions are characteristic shapes. The annotations results in the determination of corresponding shapes. In the example, the annotations are symbolized by dashed arrows (that connect the trajectories). The user could draw lines between corresponding shapes, and factor module 603 could identify the corresponding time points.

In other words, in step 310, factor module 603 determines portions that are characteristic for the time-series, but in different batch-runs (batch runs), automatically by applying predefined rules, or by interacting with an expert user (i.e. ML with supervised training).

However, except the—optional—interaction with the expert user, factor module 603 does not interact with the user any longer. It is not the human user who select appropriate factors ($\alpha 1, \alpha 2$), but factor module 603. Thereby, factor module 603 executes steps that are substantially similar to the steps that similarity module 604 will perform later (cf. method 400). FIGS. 10B and 10C give further details.

FIGS. 10B and 10C illustrate the steps being executed for F=3 different candidate factor vectors 610, with trajectories on the left side, in the center and on the right side of the figures. This approach also indicates that the steps can be performed in parallel.

FIG. 10B illustrates factor module 603 executing steps 320 (selecting factor vectors 610) and 330 (converting). Converted time-series {R}# (i.e. multiply with the alpha factors ($\alpha 1, \alpha 2$), and summing up) are illustrated for F=3 factor vectors:

(1,0) (candidate factor vector 610-1)
(0.5, 0.5) (candidate factor vector 610-2) and
(0,1) (candidate factor vector 610-3).

Converted time-series {R'}# (1,0) would look like as {R'1} and the data trajectory for {R}# (1,0) would be a characteristic signature. Converted time-series {R}# (0.5, 0.5) would keep some characteristics from {R'1}, but {R'}# (0, 0) would have lost them.

It is noted that the illustrations portions ① and ② at original time points: shape ① at t30 and at t65, and shape ② at t85 and t125. However, converted time-series {R'}# (0,1) have lost the characteristics, even worse: ① and ② are placed at shapes that have nothing ($\alpha 1=0$) do with the original (in FIG. 9A).

FIG. 10C illustrates factor module 603 executing steps 340 and 350 in variants for the 3 factor sets.

For step 340, factor module 603 uses an alignment tool (e.g., reference [1]) with DTW. Disregarding the previously determined shapes, factor module 603 aligns {R'}# and {Q'}# to a common time-scale (in the interval [~t1, ~t100] corresponding to interval [t1, t100] of {{R'}}, cf. FIG. 9A). The data points in converted time-series {Q'}# are aligned to the data points in converted time-series {R'}#. It is noted that the mapping of [t1, t150] to [~t1, ~t100] is not necessarily linear (i.e. no ⅔ factor).

The reason for disregarding is the following: In performing method 400, similarity module 604 does not execute such a determining step.

As a consequence, data values that originally had been "located" at particular time points in {{Q'}} (e.g., ① at t65 and with ② to t125), are now "located" elsewhere. In other words, original ① and ② are relocated.

For step 350, factor module 603—knowing the original "location" on the time-scale—calculates the relocation or displacement ΔT, for each portion separately.

For factor vector (1,0) the influence of the data from the second source {R'2}, {Q'2} is zero (multiplication with zero), so that the displacement ΔT is zero for both ① and ②.

For factor vector (0.5,0.5) the influence of the data from the second source {R'2},{Q'2} is still signification, and the displacements are ΔT ①=10 and ΔT ②=20. The sum (Ω=2) can be calculated as ΣΔT=30.

For factor vector (0, 1) the influence of the data from the second source {R'2},{Q'2} prevails, and the displacements are ΔT ①=30 and ΔT ②=-20. The sum (Ω=2) can be calculated as ΣΔT=10. (It is noted that the optional use of absolute values ‖ would lead to sums being 0, 20 and 50).

As in step 360, factor module 603 evaluates candidate factor vector (1,0) as leading to a minimal sum of ΔT (the sum is even zero). Therefore, (1, 0) is applicable for use in method 400 (cf. FIG. 8). In step 370, factor module 403 provides conversion factor vector 610* as (1,0). Using (0,1) would be an illustrative example for over-aggressively warping that the evaluation avoids.

It is noted that—in implementations—factor module 603 does not evaluate two batches only. Over multiple repetitions (or parallel executions), factor module 603 identifies further factors vectors. In the example, of FIG. 10, the conversion factor vector (α1, α2)=(1, 0) would be the result for that the similarity is highest (displacement sum lowest).

As a result, applying the factors in method 400 (FIG. 8) to a reference batch-run (cf. left side of FIG. 7) and to a production batch-run (cf. right side of FIG. 7) would allow the determination of similarity (or non-similarity) between the batch-runs.

FIG. 11 illustrates a third example. Compared to the first example (of FIG. 10), the third example has characteristic portions ①, ② and ③. In step 311, factor module 603 determines characteristic portions ①, ② in the time-series from the first source (i.e., in {R'1} and {Q'1}) and characteristic portions ③ in the time-series from the second source (i.e., in {R'2} and {Q'2}). In step 312, factor module determines the relations. There are two relations between the time-series from the first source, and one relation between the time-series from the second source. Factor module 603 performs the other steps as described above. Since the time-series from both sources have characteristics, factor vectors that ignore one source (such as (1, 0) and (0, 1) in FIG. 10) are very likely not conversion factor vector 610*.

For factor vector (1, 0), the alignment in step 340 would align ① above with ① below, and would align ② above with ② below (if illustrated, connections lines would be vertical, as in FIG. 9 between line 10 and 14). However, the characteristic portions ③ (and the relation between ③ above and below) would be ignored.

For factor vector (1, 1), the alignment in step 340 would align ① above with ① below, and would align ③ above with ③ below, and would align ② above with ② below, because the converted time-series would keep the characteristic portions ①, ②, ③. The alignments in ① and ② would lead to substantially zero ΔT, but the second rise ("2nd") in {Q'2} may influence the alignment in step 340. As a consequence, the displacement ΔT for ② can become larger (in comparison to a situation in that time-series {Q'2} would not have such a second rise).

In step 360, the factor vector will be selected that minimizes the sum of ΔT, potentially a factor vector (1, 0.8). Accordingly, the influence of the second rise in {Q'2} is minimized.

Figure 12:
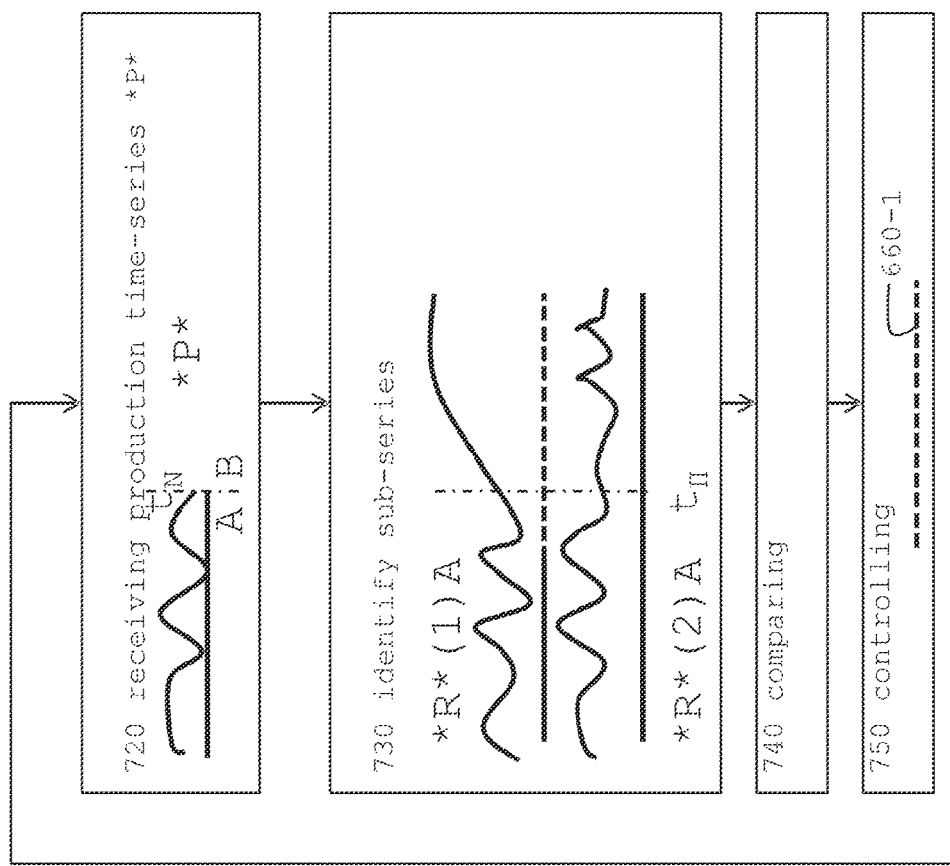
FIG. 12 illustrates a use-case scenario in that the production batch-run is not yet completed, but is being controlled.
Figure 12:
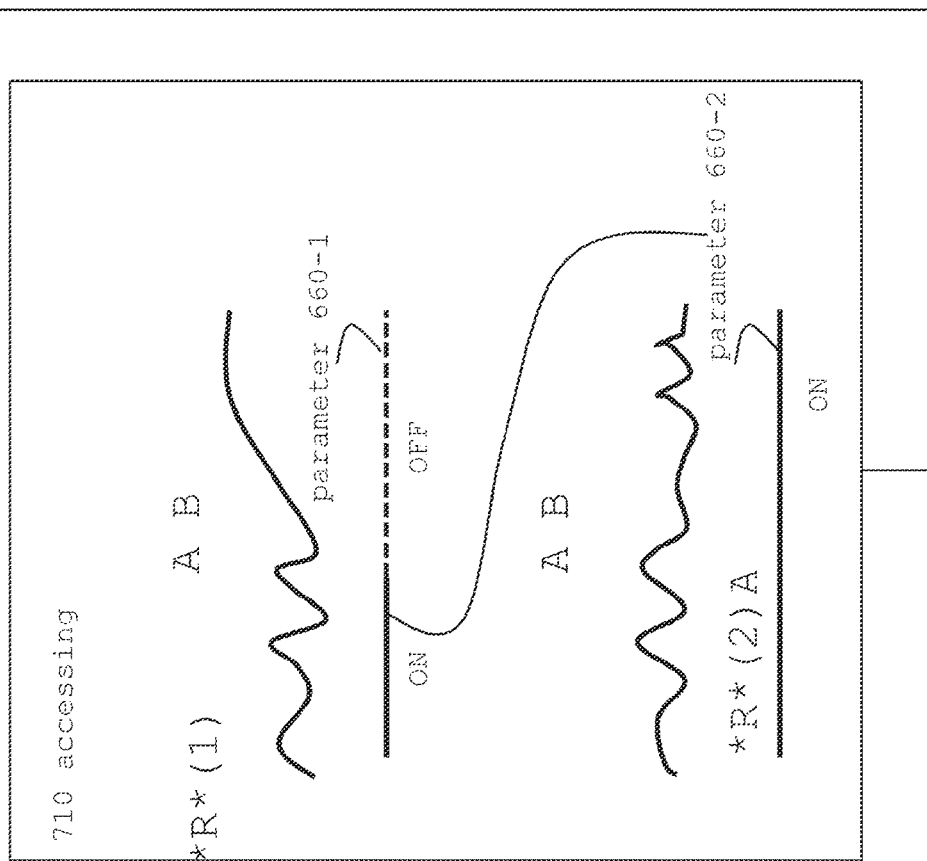

FIG. 12 illustrates a flow-chart diagram for computer-implemented method 700 to control technical equipment 110 that performs production batch-run 220. Performing the batch-run is not yet completed. Method 700 can be executed by a controller module or by other any other computer. For simplicity, the controller module is not illustrated, but it is noted that the controller module could be implemented a part of computer 600 (cf. FIG. 4). The illustration uses the conventions introduced above in FIG. 3.

In the scenarios explained above, the performance of production batch-run 220 can be considered as finalized (cf. $t_N$) and time-series with data can be considered to originate from batch runs that have been completed. In the embodiments explained above (FIGS. 1-11), similarity S' is assumed to be determined after production batch-run 220 is completed, by comparison 430, for example.

There is a desire to identify a quality indicator (or the quality category of production batch-run 220) at that early point in time when modifying an abnormal batch-run is still possible. There is time required to perform steps 420/430 of method 400, but this run-time can be shorter than the overall batch run-time (i.e. the duration $T_P$). Determining quality AFTER production is useful, but determining quality DURING production is potentially more relevant.

In step 710 of method 700, the controller module accesses at least one reference time-series with data from at least one previously performed batch-run (210, cf. FIGS. 1-2) of production process 200 (cf. FIGS. 1-2). FIG. 12 gives an example with two reference time-series *R*(1) and *R*(2). The notation with the indices in ( ) stands for two previously performed batch-runs. It does not matter of the time-series are uni- or multi-variate, therefore the * * notation is used. In the example, the time-series are bi-variate time-series. The controller module can access the time-series from data repository 650, or otherwise, cf. FIG. 4.

At least one of the reference time-series has a quality category that serves as a target for the production batch-run. In the example, *R*(1) has the target quality "success". R*(2) hast the non-target quality "failure". The distinction into positive and negative target (e.g., success/failure) serves as an example, but further categories (i.e., further granularities of the indicators) can also be used. It is desired that the production batch-run results in the target quality.

For simplicity, step 710 is visualized with reference data illustrated by trajectories for a bi-variate time-series, with a line above and a line below (as in FIG. 1).

The (at least one) reference time-series is associated with parameter 610-1/610-2 for technical equipment 110. FIG. 12 gives an example for the parameter being a status indicator that is part of the bi-variate time-series, symbolized by the lines below. The status can be "OFF" (dashed line, parameter 660-1), or "ON" (plain line, parameter 660-2).

In step 720—while technical equipment 110 performs production batch-run 220—the controller module receives a production time-series *P* with data (here illustrated as a bi-variate time-series as well).

In step 730, the controller module identifies a sub-series of the reference times-series. The division into sub-series is a division in terms of time. In the example, with the two reference time-series *R*(1) and *R*(2), there are two sub-series *R*(1)$_A$ and *R*(2)$_A$. Index "A" stands for the phase that corresponds to the time interval of production time-series *P* that has already passed.

Semantics (i.e., quality categories) can applied to the phases A and B optionally, such as failure/success, failure/failure, success/success, and success/failure. The category of phase is the target.

As explained above, reference times-series comprise data in the interval [$t_1$, $t_M$], cf. FIG. 3. To use this notation, sub-series comprise data in the interval [$t_1$, $t_\Pi$] (uppercase Greek Pi), with $\Pi < M$. The end index $\Pi$ can be different for each sub-series (because reference batch-run can have different duration).

Likewise, production time-series *P* comprises data in the interval [$t_1$, $t_N$]. Since technical equipment 110 is performing the batch-run, the number N of data values is increasing, but for the *P* that has been received, N should be constant. Data for phase B is therefore not yet available. In other words, identifying a sub-series (of the data) conceptually divides the performance of the batch-runs into consecutive phases A and B. Dashed vertical lines indicate the transition from phase to phase. Reference data *R* is available for phase A and for phase B, as reference data *R*$_A$ and *R*$_B$, but production data is available for phase A only.

For simplicity of explanation, it can be assumed that for the example of FIG. 12, the number of data values is the same: $N=\Pi(1)=\Pi(2)$. In other words, the controller module determines the progress of the production run and selects the sub-series accordingly.

It is noted that the identification can be performed by techniques that have been explained above, by interaction with expert users, or by machine learning (the phases are selected similar to the above-explained factors α). A modification to that approach will be explained below.

Parameters 610-1 and 610-2 are available for both reference batch-runs, respectively. As mentioned, the figure illustrates the parameter by horizontal lines, partly dashed, partly plain. In the example, in reference time-series *R*(1), the parameter switches from ON to OFF, shortly before $t_\Pi$, in reference time-series *R*(2), the parameter remains ON all of the time.

The non-availability of data *P* for phase B is an advantage, because the production can still be modified.

In step 740, the controller module compares the received production time-series and the sub-series of the reference time-series.

In the example, there are two reference time-series available for comparison. *R*(1)$_A$ and *R*(2)$_A$. It is noted that not all variates need to be compared. In the example, at least the trajectories above are compared.

Comparing results in an indication of similarity or non-similarity. In the example, both sub-series *R*(1)$_A$ and *R*(2)$_A$ are similar to *P*. However, *R*(1) and *R*(2) (over the complete duration A and B, not only initially A) previously resulted in different quality categories: Reference batch-run (1) resulted in "success" (the target quality) and the reference batch-run (2) resulted in "failure". In other words, when the controller module accesses *P*, the production batch-run run in the "success" category for phase A, but the potential to continues as a "success" or as a "failure". In executing comparing 740, controller module processed an amount of data that is limited (phase A only) so that the computation time is short enough to identify a control parameter that can still be applied while the production batch-run continues.

In case of similarity, the controller module uses a parameter (610-1) as control parameter to control the technical equipment (110) during the continuation of the production batch-run (210) In this case the parameter is taken as the OFF-parameter 610-1 of *R*(1) that resulted in "success".

In other words, using parameter 660-1 (OFF) was proven to contribute to the successful completion of reference batch-run (1) (as of the target), and parameter 660-2 (ON) was proven to contribute to the failure.

Controlling production batch-run (2) can be performed automatically. In this case, the controller module would identify (line below) the parameter settings of production batch-run 220 as ON (cf. the plain line), but would change this to OFF. In other words, technical equipment would be instructed to switch a particular component (of technical equipment 110) OFF. The result is a batch-run that potentially results in a "success". The illustration is simplified: more parameters could be used.

Also, the identification of similarity between data from the on-going production batch-run (as far as already available) with reference data (for a corresponding phase) in combination with known a quality category of the reference provides an indicator of the status of technical equipment 110 as a technical system.

In the example of FIG. 12, the status indicator could be the following:

The technical equipment performs the production batch-run similar to a reference batch-run that finally failed.

The technical equipment performs the production batch-run such that it can be modified to continue similar to a batch-run that finally succeeded, by taking over the parameters (ON to OFF).

The indicator can be also communicated to the operator who can than modify the operation of technical equipment (i.e., to switch OFF the component manually).

In the example, the quality categories for the reference batch-run are "success" vs. "failure." It is however possible to use categories with finer granularity. For example, reference batch-runs can be categorized as "problematic" in phase A and conditionally "success" in phase B, with conditions such as setting the parameter to OFF.

Or, a reference batch-run can be classified as "non-correctable failure" for phase A. Should step 740 show that production batch-run 220 is in the same category, the operator would have to cancel production batch-run 220.

Looking at the details of step 730, phase-specific comparison can be executed in a variety of ways, among the following:

Multi-variate time-series {{ }} can be compared by techniques of reference [1], such as by time-warping, also cf. © in FIG. 2).

Multi-variate time-series {{ }} can be converted, so that step 730 uses converted time-series { }# as described above (cf. conversion in steps 330/410/430).

Multi-variate time-series {{ }} can be pre-processed as described in the following with FIG. 13 so the comparison is a feature-matrix comparison.

Having described the comparison 430 (FIG. 8) under the condition that the time-series (to be compared) have obtained the uni-variate property through conversion, the description describes a further option.

Figure 13:
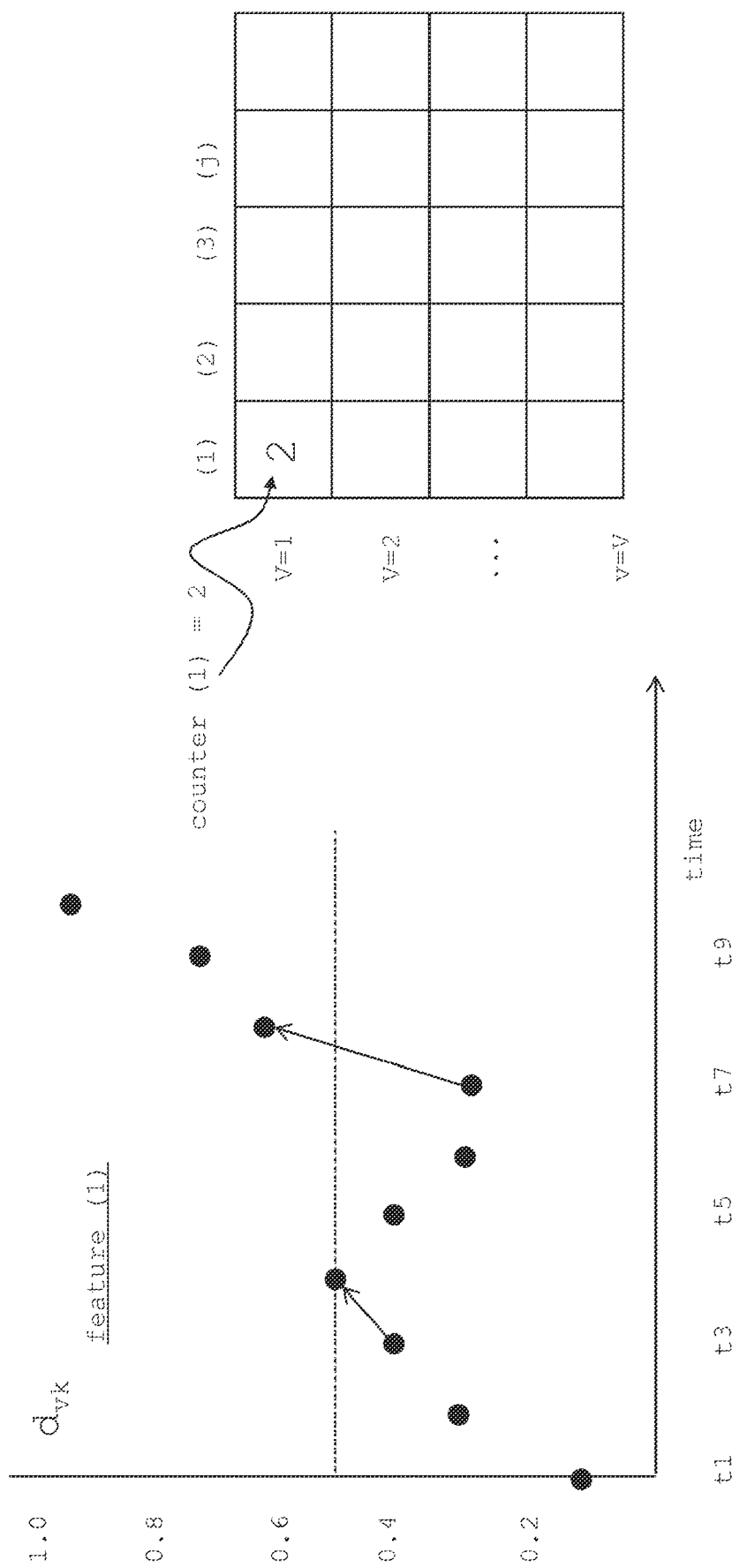
FIG. 13 illustrates an approach to determine a similarity index (or other indicator) for comparing multi-variate time-series.

FIG. 13 illustrates a time-diagram (left side) to show an approach to determine a similarity index (or other indicator) for comparing multi-variate time-series, such as reference time-series {{R}} and production time-series {{P}}. On the right side, FIG. 13 also illustrates a features matrix that is being derived. The approach can be used instead of time-warping (cf. reference [1] and/or FIG. 1). The approach uses methodology from signal processing.

The controller module executes step accessing 710 (cf. FIG. 12) for reference time-series *R* of a plurality of previously performed batch-runs of the production process 200, and performs step receiving 720. In step comparing 740, the controller module counts the occurrence of pre-defined changes between consecutive data values of uni-variate time-series that belong to the multi-variate time-series (so-called "features"), and stores the counter into matrices. The controller module performs such pre-processing for the sub-series (of the references) in phase A and for the production time-series. It is noted that pre-processing the reference can be performed once so that the controller performs accessing 710 with time-series that are pre-processed into matrices (saving computation time while the production is ongoing).

The controller module then determines a similarity metric between the matrices (of the reference and of the production time-series).

The approach will be explained for pre-processing a time-series {{D}} and the approach will be applied to {{R}} and to {{P}} likewise. The features are identified for {Dv} separately, and the features are identified by a feature index (j). The features are counted. One {Dv} can show different features occurring in different counters quantities. Features are explained by example for the time-diagram on the left side of FIG. 13.

For feature (1)—the threshold reaching feature—the value d of {Dv} reaches a value peak of 0.5 (or higher, an absolute value, in the diagram with the horizontal line), that is: dv k<0.5 and dv k+1≥0.5. For example, for a (much simplified) time-series with K=10, the value reaches 0.5, goes below 0.5, stays below for a couple of time points and rises again: 0.1, 0.3, 0.4, 0.5 (feature occurred), 0.4, 0.3, 0.3, 0.6 (feature occurred), 0.7, 0.9. The occurrence of the feature is counted as: Counter(1)=2

For feature (2)—the jump-by-delta feature—the value d of {Dv} rises by a 0.5 (or higher, relative value change) in comparison to its previous value (in one time-step), that is: dv k+1≥dv k+0.5. Assuming that the value d of {Dv} can drop at a later point in time, the feature can occur multiple times as well, it can be counted (to counter (2)=3), as in the following example: 0.1, 0.2, 0.6 (feature occurred), 0.4, 0.4, 0.1, 0.7 (feature occurred), 0.1, 0.8 (feature occurred), 0.7, feature (3)

Feature (3) is the jump-by-delta feature is a variation. This is similar as feature (2) but a drop by 0.5 (from k to k+1). In an example, counter (3)=3.

Feature (4)—the threshold crossing feature—can be assigned for crossing a predefined threshold, such as 0.5: (dv k<0.5 AND dv k+1>0.5) OR (dv k>0.5 AND dv k+1<0.5) There is an assumption for counter (4)=1 (cf. the crossing from dv7 to dv8).

It is noted that comparing data values dvk+1 to preceding data values dvk (or to successor values), with different of one time slot Δt (or more than one) is agnostic to the time scale.

In application to multi-variate time-series {{D}}, the counters C(j) are written to a matrix: In the example, the number of rows equals the number of components V (i.e. sources) in the multi-variate time-series; and the number of columns equals the number of different features considered (here 4). The entry C(v,j) is defined to count the number of occurrences of feature (j) in the uni-variate series {DV}.

Table 1 provide an example matrix CR(v,j) for a first bi-variate time-series {{D1} {D2}}R, in the example, the counters are taken for v=1. (The first row corresponds to the example, just explained). Subscript R indicates that the time-series results from a reference batch-run.

TABLE 1

| variate | feature | | | |
|---|---|---|---|---|
| | (1) | (2) | (3) | (4) |
| v = 1 | 2 | 2 | 3 | 1 |
| V = 2 | 2 | 1 | 1 | 0 |

Table 2 provides an example matrix CP(v,j) for second bi-variate time-series {{D1} {D2}}P. Subscript P indicates that the time-series results from a production batch-run.

TABLE 2

| variate | feature | | | |
|---|---|---|---|---|
| | (1) | (2) | (3) | (4) |
| v = 1 | 2 | 2 | 1 | 1 |
| V = 2 | 1 | 1 | 1 | 0 |

A metric applied to the space of matrices can define the similarity metric. For example, the metric is the sum of the absolute values of the differences over the elements of the matrices. In the simplified example, the similarity metric is calculated as metric=ΣvΣj

|C_R(v,j)−C_P(v,j)|
with v=1 to V (in the example V=2), with j=1 to J (in the example J=4).

In the example, the metric is calculated as 1+2=3. In other words, the similarity index between {{R}} and {{P}} has been calculated as S=3. Depending on a pre-defined threshold, both batch-runs are similar (or not).

Taking the example signature of FIG. 8 (phase A) into account, the matrix approach can be used to detect similarity. The signature of phase A shows oscillations that might result from a particular time-series. In such a time-series, feature (4) with the mid-value crossings would occur approximately 6 times.

For determining the similarity metric between the matrices, those of skill in the art can apply further approaches, among them calculating the Manhattan distance, the cosine similarity, and Levenshtein distances (known from textbooks). It is noted that matrices can be clustered as well, to identify reference (and production) batch-runs that are similar (and that lead to the same quality indicator). Clustering algorithms such as k-nearest-neighbours are known in the art, the above-mentioned similarity metric can be used as well.

Once similarity (or non-similarity) between time-series (and hence similarity between process batch-runs) is being detected, the controller module can present the results to the operators. In the following, this is explained by example. The module can display trajectories for similar batches. For example in FIG. 12, the computer can show the phase-B trajectories of the references, the phase-B trajectory for reference batch-run 210-1 shows the potential correction (parameter 660-1 OFF, optionally with historic data regarding parameters of equipment 110) and the phase-B-trajectory for reference batch-run 210-2 can show the potential failure outcome. Displaying alerts or alarms is possible, for example, when the computer determines similarity of the production batch-run with a reference batch-run that has a "negative" quality category (such as "failure").

FIGS. 12-13 also illustrate one or more computer programs or computer program products. The computer program products—when loaded into a memory of a computer and being executed by at least one processor of the computer—perform the steps of the computer-implemented method.

Figure 14:
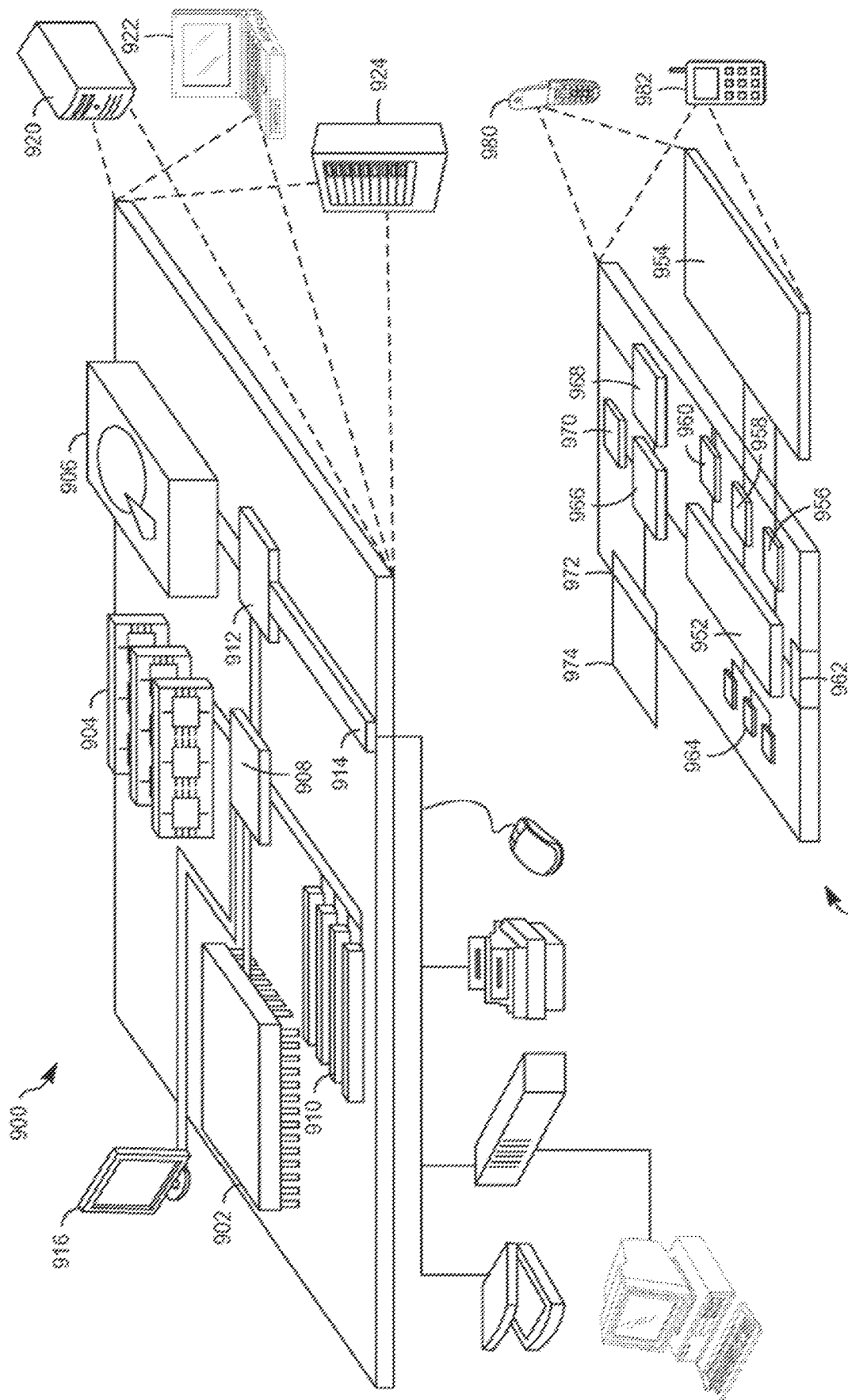
FIG. 14 illustrates an example of a generic computer device and a generic mobile computer device, which may be used with the techniques described here.

FIG. 14 is a diagram that shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Generic computer device may 900 correspond to the computer system 600 of FIG. 1. Computing device 950 is intended to represent various forms of mobile devices, such as personal digital assistants, cellular telephones, smart phones, and other similar computing devices. For example, computing device 950 may include the data storage components and/or processing components of devices as shown in FIG. 1. The components shown here, their connections and relationships, and their functions, are meant to be exemplary only, and are not meant to limit implementations of the embodiments of the invention described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While one or more embodiments of the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A computer-implemented method to determine a quality indicator (Q) of a particular production batch-run in accordance with a predefined production process, wherein technical equipment performs the predefined production process and thereby provides data in the form of time-series from a set of data sources, wherein the data sources are related to the technical equipment, the method comprising:
    obtaining a conversion factor vector by applying a machine-learning algorithm to reference data from two reference batch-runs of the predefined production process, wherein the conversion factor vector comprises a set of source-specific factors for the set of data sources;
    receiving a multi-variate time-series ({{R}}) from a further reference batch-run of the predefined production process, the further reference batch-run of the predefined production process conforming to a particular quality category, the multi-variate time-series ({{R}}) having a set of uni-variate time-series ({Rv}) from the set of data sources;
    converting the multi-variate time-series ({{R}}) from the further reference batch-run into a converted reference time-series ({R} #) that is uni-variate, by multiplying data values of each of the set of uni-variate time-series ({Rv}) with a respective source-specific factor from the conversion factor vector, followed by summing up the multiplied data values of the set of uni-variate time-series ({Rv}) according to discrete time points of the multi-variate time-series ({{R}}) of the reference batch-run;
    receiving a production multi-variate time-series ({{P}}) from the production batch-run of the predefined production process, the production multi-variate time-series ({{P}}) having a set of uni-variate time-series ({Pv}) from the set of data sources;
    converting the production multi-variate time-series ({{P}}) from the production batch-run into a converted production time-series ({P} #), by multiplying data values of each of the uni-variate time-series ({Pv}) with the respective source-specific factor of the conversion factor vector, followed by summing up the multiplied data values of the set of uni-variate time-series (({Pv})) according to discrete time points of the multi-variate time-series ({{P}} from the production batch-run;
    comparing the converted reference time-series ({R} #) with the converted production time-series ({P} #), thereby determining whether the production batch-run of the predefined production process conforms to a particular quality category or does not conform to the particular quality category; and
    controlling parameter settings of the production batch-run based on whether the production batch-run of the predefined production process conforms to the particular quality category or does not conform to the particular quality category, wherein the parameter settings of the production batch-run relate to one or more components of the technical equipment that performs the predefined production process.

2. The method according to claim 1, wherein the comparing step is executed with a time-warp operation.

3. The method according to claim 1, wherein the technical equipment is industrial equipment, with the data sources being selected from sources that provide measurement values, from sources that provide control instructions, and from sources that provide status indicators.

4. The method according to claim 1, wherein the quality category (Q) is a quality category for the performance of the predefined production process.

5. The method according to claim 1, wherein the machine-learning algorithm for obtaining the conversion factor vector comprises:
    receiving the reference data from the two reference batch-runs of the predefined production process, the reference data being a first multi-variate time-series ({{R'}}) and a second multi-variate time-series ({{Q'}});
    wherein the first and the second multi-variate time-series ({{R'}}, {{Q'}}) both comprise first uni-variate time-series ({R'1}, {Q'1}) with data from a first data source and second uni-variate time-series ({R'2}, {Q'2}) with data from a second data source;
    determining characteristics by determining characteristic portions of the uni-variate-time-series, and determining relations between the characteristic portions between the first uni-variate time-series ({R'1}, {Q'1}) and the second uni-variate time-series ({R'2}, {Q'2});
    for each respective candidate factor vector of a plurality of candidate factor vectors:
    converting the first multi-variate time-series ({{R'}}) to a converted first time-series ({R'} #) and the second multi-variate time-series ({{Q'}}) to a converted second time-series ({Q'} #);
    aligning the converted first time-series ({R'} #) and the converted second time-series ({Q'} #) by executing a time-warp operation;
    evaluating portion-specific displacements (ΔT) of the relations to identify a particular factor vector of the plurality of candidate factor vectors as the conversion factor vector.

6. The method according to claim 5, wherein the receiving the reference data from the two reference batch-runs of the predefined production process comprises receiving a first group of reference time-series having the quality category that is to be determined for the production batch-run, and a second group of reference times-series having either quality category.

7. The method according to claim 5, wherein the evaluating the portion-specific displacements ($\Delta T$) comprises obtaining a sum ($\Sigma \Delta T$) of the portion-specific displacements ($\Delta T$), and identifying the particular factor vector so that the sum ($\Sigma \Delta T$) of the portion-specific displacements ($\Delta T$) is smallest.

8. The method according to claim 7, wherein the sum ($\Sigma \Delta T$) of the portion-specific displacements ($\Delta T$) comprises a sum of absolute values ($\Sigma |\Delta T|$) of the portion-specific displacements ($\Delta T$).

9. The method according to claim 5, wherein the determining characteristics comprises an interaction with a user, with presenting the first and second multi-variate time-series (${\{R'\}}$, ${\{Q'\}}$) by their trajectories to the user, and with the determining the characteristic portions and the determining the relations through annotations made by the user.

10. The method according to claim 5, wherein the determining characteristics comprises processing the first and second multi-variate time-series (${\{R'\}}$, ${\{Q'\}}$) with curve-sketching techniques, and the determining the characteristic portions and the determining the relations through pre-defined rules.

11. The method according to claim 1, wherein in the multi-variate time-series are received with numerical values that have been normalized.

12. A computer system adapted to execute the method according to claim 1.

13. A non-transitory computer-readable storage medium storing instructions that, when executed by at least one processor of a computer, cause performance of the steps of the computer-implemented method according to claim 1.

* * * * *